United States Patent
Xia et al.

(10) Patent No.: US 8,180,185 B2
(45) Date of Patent: May 15, 2012

(54) FIBER OPTIC SENSOR FOR DETECTING MULTIPLE PARAMETERS IN A HARSH ENVIRONMENT

(75) Inventors: Hua Xia, Altamont, NY (US); Mahadevan Balasubramaniam, Ballston Lake, NY (US); Jie Jiang, Clifton Park, NY (US); Huageng Luo, Clifton Park, NY (US); Abdul Rahman Abdallah Al-Khalidy, Niskayuna, NY (US); Clayton Ming Young, Schenectady, NY (US); Kevin Thomas McCarthy, Troy, NY (US)

(73) Assignee: General Electric Company, Niskayuna, NY (US)

( * ) Notice: Subject to any disclaimer, the term of this patent is extended or adjusted under 35 U.S.C. 154(b) by 1093 days.

(21) Appl. No.: 12/026,229

(22) Filed: Feb. 5, 2008

(65) Prior Publication Data

US 2011/0170823 A1    Jul. 14, 2011

Related U.S. Application Data

(63) Continuation-in-part of application No. 11/689,850, filed on Mar. 22, 2007, now Pat. No. 7,336,862.

(51) Int. Cl.
  *G02B 6/00* (2006.01)
  *G02B 6/34* (2006.01)
(52) U.S. Cl. ............................................ 385/12; 385/37
(58) Field of Classification Search .................... None
  See application file for complete search history.

(56) References Cited

U.S. PATENT DOCUMENTS

| | | | |
|---|---|---|---|
| 4,140,505 A | 2/1979 | Ramsay et al. | |
| 4,807,950 A * | 2/1989 | Glenn et al. | 385/123 |
| 5,978,538 A | 11/1999 | Miura et al. | |
| 6,404,956 B1 * | 6/2002 | Brennan et al. | 385/37 |
| 6,668,105 B2 | 12/2003 | Chen et al. | |
| 6,928,202 B2 | 8/2005 | Pickrell et al. | |
| 6,993,221 B2 * | 1/2006 | Mihailov et al. | 385/37 |
| 7,017,417 B2 | 3/2006 | Daigle | |
| 7,120,340 B2 | 10/2006 | Berkey et al. | |
| 7,203,399 B2 | 4/2007 | Ishikawa et al. | |
| 7,336,862 B1 | 2/2008 | Xai et al. | |
| 7,376,307 B2 | 5/2008 | Singh et al. | |
| 7,421,162 B2 | 9/2008 | McCarthy et al. | |
| 2004/0120643 A1 | 6/2004 | Viswanathan et al. | |

FOREIGN PATENT DOCUMENTS

CN    1837874 A    9/2006

(Continued)

OTHER PUBLICATIONS

I. W Park et al., "An irrecoverable change in the refractive index of plasma self-channeled silica fibers caused by femtosecond optical pulses," Applied Physics Letters, vol. 83, No. 4, Jul. 28, 2003, pp. 656-658.

(Continued)

*Primary Examiner* — Uyen Chau N Le
*Assistant Examiner* — Chris Chu
(74) *Attorney, Agent, or Firm* — Ann M. Agosti

(57) ABSTRACT

A fiber optic sensor is provided. The fiber optic sensor includes a fiber core having a plurality of grating elements wherein, the grating elements comprise a periodic or a quasiperiodic modulated microcrystalline and silicon dioxide tetrahedral structure and a cladding disposed about the fiber core.

9 Claims, 19 Drawing Sheets

FOREIGN PATENT DOCUMENTS

WO  2006107278  10/2006

OTHER PUBLICATIONS

K.D. Hammonds et al., "Rigid-unit phonon modes and structural phase transitions in framework silicates," American Mineralogist, vol. 81, 1996, pp. 1057-1079.

C.W. Smelser et al., "Formation of Type I-IR and Type II-IR gratings with an ultrafast IR laser and a phase mask," Optics Express, vol. 13, No. 14, Jul. 11, 2005, pp. 5377-5386.

E.N. Glezer et al., "Ultrafast-laser driven micro-explosions in transparent materials," Applied Physics Letter, vol. 71, No. 7, Aug. 18, 1997, pp. 882-884.

J.W. Chan et al., "Structural changes in fused silica after exposure to focused femtosecond laser pulses," Optics Letters, vol. 26, No. 21, Nov. 1, 2001, pp. 1726-1728.

D. Grobnic et al., "Long-term thermal stability tests at 1000 oC of silica fibre Bragg gratings made with ultrafast laser radiation," Institute of Physics Publishing, Measurement Science Technology, vol. 17, 2006, pp. 1009-1013.

M.G. Xu et al., Discrimination between strain and temperature effects using dual-wavelength fibre grating sensors, Electronics Letters, Jun. 23, 1994, vol. 30, No. 13, pp. 1085-1087.

A. D. Kersey et al., "Fiber Grating Sensors," Journal of Lightwave Technology, vol. 15, No. 8, Aug. 1997, pp. 1442-1463.

O. Frazao et al., "Applications of Fiber Optic Grating Technology to Multi-Parameter Measurement," Fiber and Integrated Optics, vol. 24, No. 3-4, 2005, pp. 227-244.

S. Pal et al., "Characteristics of potential fibre Bragg grating sensor-based devices at elevated temperatures," Institute of Physics Publishing, Measurement Science and Technology, vol. 14, No. 7, 2003, pp. 1131-1136.

T. Bosselmann et al.,"Innovative applications of fibre-optic sensors in energy and transportation," 17th International Conference on Optical Fibre Sensors, May 23-27, 2005, Proceedings SPIE, vol. 5855, pp. 188-193.

A. Fernandez Fernandez et al., "Fibre Bragg grating temperature sensors for harsh nuclear environments," 15th International Conference on Optical Fibre sensors, May 6-10, 2002, paper TuA4, pp. 63-66.

Y.J. Rao et al., "Temperature-Strain Discrimination Using a Wavelength-Division-Multiplexed Chirped in-Fibre-Bragg-Grating/Extrinsic Fabry-Perot Sensor System," 15th International Conference on Optical Fibre sensors, May 6-10, 2002, paper TuP21, pp. 207-210.

S.J. Mihailov et al., "Bragg Gratings Written in AII-SiO2 and Ge-Doped Core Fibers with 800-nm Femtosecond Radiation and a Phase Mask," Journal of Lightwave Technology, vol. 22, No. 1, Jan. 2004, pp. 94-100.

"Cristobalite," Wikipedia, The Free Encyclopedia (Online), http://en.wikipedia.org/wiki/Cristobalite, printed Feb. 9, 2009.

U.S. Appl. No. 90/009,446, Ex Parte Reexamination Office Action, Patent No. 7,336,862, Mailed Feb. 5, 2010.

S. J. Mihailov et al., "Fiber Bragg Gratings Made with a Phase Mask and 800-nm Femtosecond Radiation," Optics Letters, vol. 28, No. 12, Jun. 15, 2003, XP-001166541, ISSN 0146-9592, pp. 995-997.

D. D. Davis et al., "Very-high-temperature stable CO2-laser-induced long-period fibre gratings," Electronics Letters, vol. 35, No. 9, Apr. 29, 1999, pp. 740-742.

Y. Kondo et al., "Three-Dimensional Microscopic Crystallization in Photosensitive Glass by Femtosecond Laser Pulses at Nonresonant Wavelength," Japanese Journal of Applied Physics, vol. 37, No. 1A-B, Jan. 15, 1998, pp. L94-L96.

PCT/US2008/05314 Search Report, Sep. 17, 2008.

* cited by examiner

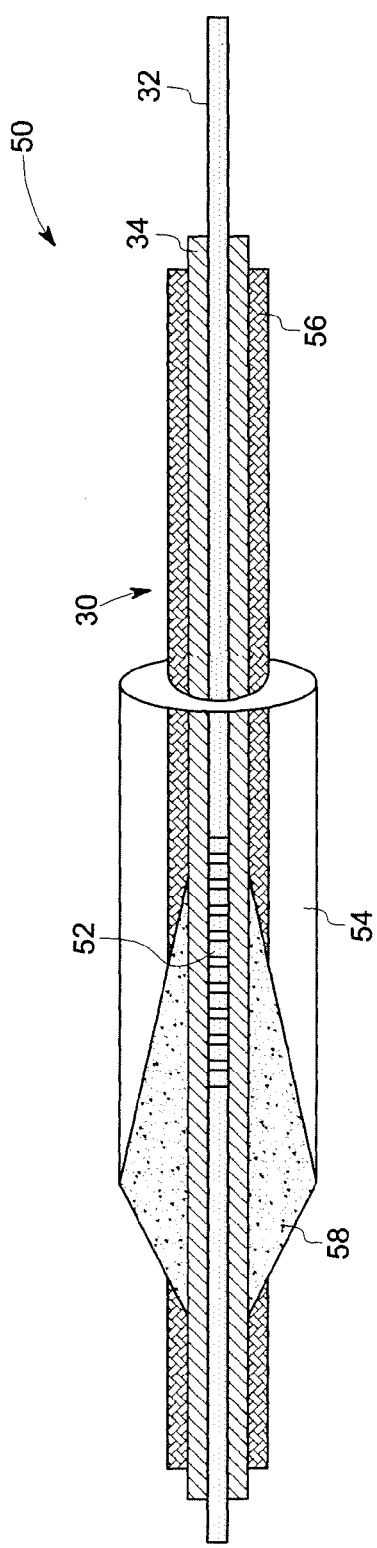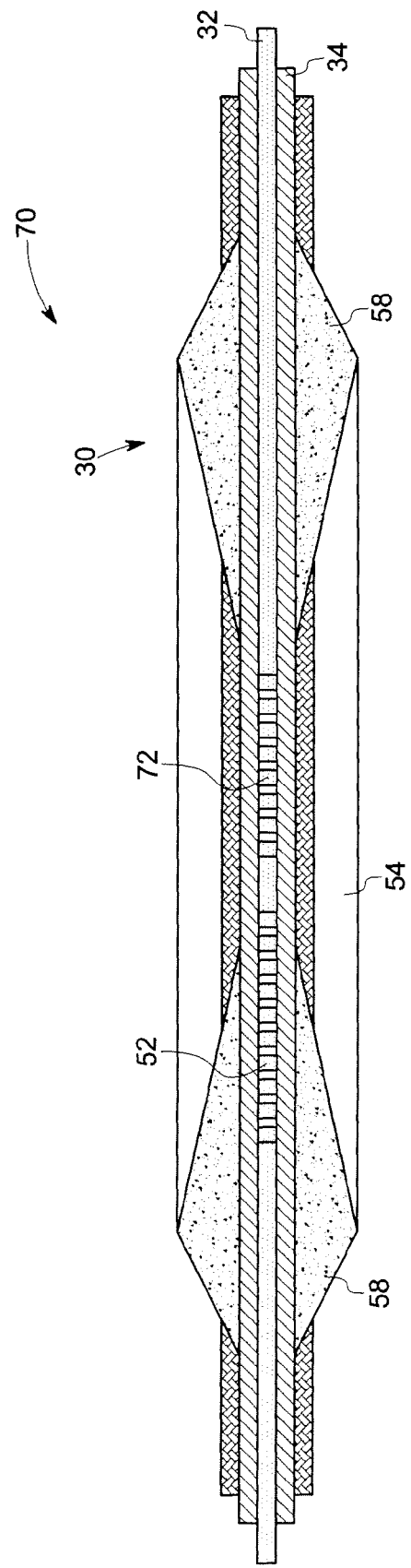

FIBER OPTIC SENSOR FOR DETECTING MULTIPLE PARAMETERS IN A HARSH ENVIRONMENT

CROSS REFERENCE TO RELATED APPLICATIONS

This application is a Continuation in Part of U.S. patent application Ser. No. 11/689,850, filed 22 Mar. 2007, which is herein incorporated by reference.

BACKGROUND

The invention relates generally to fiber optic sensors, and more particularly to a fiber optic Bragg grating sensor for detecting multiple parameters in a harsh environment.

Various fiber optic sensing devices are known and are in use for physical and chemical detection and measurement. As one example, fiber Bragg grating sensors are employed to measure parameters such as strain, vibrations, pressure, flow rate and temperature in components such as exhaust systems, nuclear reactors, combustors and compressors. Conventional fiber Bragg grating sensors employed for dynamic strain and temperature measurements include a grating structure inscribed on to a photosensitive single-mode fiber core. Typically, the fiber core is doped with Germanium oxides or co-doped with boron, fluorine, phosphors, erbium etc. Such dopants lead to formation of intra-band impurity energy levels in a silicon dioxide band gap. Furthermore, the dopants distributed in these impurity bands can be thermally excited to a conduction band and consequently induce thermal variation of the conductivity thereby causing degradation of the refractive index modulation of the fiber grating structure. Therefore, thermal stability of such sensors is limited by the operational conditions in which they may be employed.

Current fiber Bragg grating sensors are typically limited to be operated to temperatures less than about 120° C. because of temperature dependent dopant diffusion induced grating fading. Such sensors employ a doped or chemical grating that breaks down in high temperature environments. A thermal post-treatment process is typically used for stabilising the fiber grating's refractive index modulation amplitude, but such fiber Bragg grating-based sensors still have low reliability while operating above the annealing temperature.

Furthermore, as with the thermal effect, any high-energy radiations, gamma-ray and neutrons, in an environment like nuclear reactor also can prompt dopant diffusion and formation of color centers, and other defects that can lead to degradation of the fiber grating structure and the refractive index modulation.

Certain other systems employ piezoelectric-based or magnetostrictive-based sensors, such as strain gages and accelerometers, for detecting parameters such as strain and seismic signals in a harsh environment. However, such sensing devices are also limited to low-temperature environmental applications, and suffer from electromagnetic interference and radiation degradation issues.

Accordingly, there is a need for sensor that can be employed to detect a parameter, such as, temperatures or dynamic strains, in a harsh environment. Furthermore, it would be desirable to provide a sensor that can simultaneously detect multiple parameters, for example, temperature, dynamic strain, vibration, and mass flow for structural health monitoring in a harsh environment.

BRIEF DESCRIPTION

Briefly, according to one embodiment a fiber optic sensor is provided. The fiber optic sensor includes a fiber core having a plurality of grating elements wherein, the grating elements comprise a periodic or a quasiperiodic modulated microcrystalline and silicon dioxide tetrahedral structure and a cladding disposed about the fiber core.

In another embodiment, a method of fabricating a fiber optic sensor is provided. The method includes providing a fiber core and inscribing a periodic or a quasiperiodic microcrystalline and silicon dioxide grating structure on the fiber core.

The method also includes converting an under-constrained silicon dioxide structure to an over-constrained silicon dioxide tetrahedral structure.

In another embodiment, a distributed sensing system for sensing a plurality of parameters is provided. The sensing system includes a plurality of sensors disposed on a distributed cable, wherein each of the plurality of sensors includes a fiber core having a periodic or a quasiperiodic modulated microcrystalline and silicon dioxide tetrahedral grating structures and a cladding disposed about the fiber core.

DRAWINGS

These and other features, aspects, and advantages of the present invention will become better understood when the following detailed description is read with reference to the accompanying drawings in which like characters represent like parts throughout the drawings, wherein:

FIG. 3 is a diagrammatical illustration of an exemplary configuration of a single fiber Bragg grating (FBG) sensor package for measuring strain and vibration in a harsh environment.

FIG. 4 is a diagrammatical illustration of an exemplary configuration of a temperature compensated FBG sensor package for measuring strain and vibration in a harsh environment.

DETAILED DESCRIPTION

Figure 1:
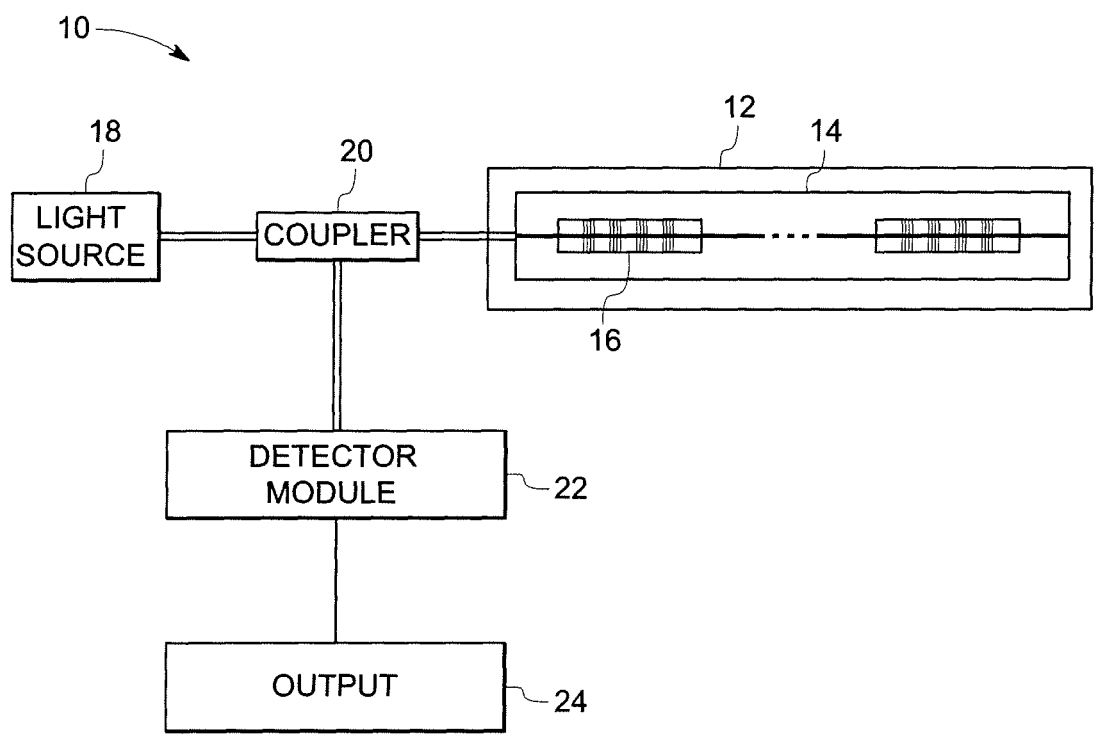
FIG. 1 illustrates an exemplary fiber optic sensing system for detecting multiple parameters in a harsh environment and/or for an object in accordance with aspects disclosed herein.

Referring now to drawings, FIG. 1 illustrates an exemplary fiber optic sensing system 10 for detecting multiple parameters in a harsh environment and/or for an object 12. Although the present discussion focuses on sensing devices and systems, the embodiments are not limited to the sensing field, but are also applicable to other modalities, such as, optical filters, data transmission, and telecommunications, among others. Accordingly, the appended claims should not be limited to or by the exemplary embodiments of the following discussion. The fiber optic sensing system 10 includes a plurality of fiber optic sensors such as represented by reference numeral 14 that, in turn, includes a grated cable 16. As illustrated, the cable 16 is disposed within the element 12, causing changes in the element 12 to translate to the cable 16. The grated cable 16 includes a core that has a plurality of grating elements having a periodic or a quasiperiodic modulated grating structure, which is described in detail below. As used herein, the term "quasiperiodic modulated grating" includes a grating structure with a variable periodicities across a grating length of the grating structure. In certain embodiments, the quasiperiodic modulated grating structure includes a chirped grating structure having a refractive index modulation according to a Fibonacci sequence. In the present discussion, a grating element refers to a variance in the index of refraction in comparison to the index of refraction of the core. Such grating elements may be a result of laser and material interaction process, such as high power femto second laser fiber Bragg grating (FL FBG) and phase mask inscribing technique that is discussed further below. Although FBG type sensors are described herein for purposes of example, other types of grating structures may be used.

Further, the fiber optic sensing system 10 includes a light source 18, such as a tunable laser or broadband superluminescent light source that is configured to illuminate the core of the grated cable 16. This illumination facilitates the generation of reflected signals corresponding to a grating period of the grated cable 16. In the illustrated embodiment of FIG. 1 wherein the grating comprises a fiber Bragg grating, the reflected signal of each fiber Bragg grating of the grated cable 16 is determined by $2n\Lambda$, where n is an effective grating refractive index and $\Lambda$ is the periodicity of the refractive index modulation of that grating element. Further, since the periodicities of all grating elements of the grated cable 16 are different, the reflected signals consist of multiple peaks in the reflection spectra. The system 10 also includes an optical coupler 20 to manage incoming light from the light source 18 as well as the reflected signals from the grated cable 16. The coupler 20 directs the appropriate reflected signals to a detector module 22.

The detector module 22 receives the reflected optical signals from the grated cable 16 and, in cooperation with various hardware and software components, analyzes the embedded information within the optical signals. For example, the detector module 22 is configured to estimate a condition or a parameter of the object 12 based upon reflection spectra generated from the plurality of grating elements of the grated cable 16 of the fiber optic sensors 14. In certain embodiments, the detector module 22 employs an optical coupler or an optical spectral analyzer to analyze signals from the fiber optic sensors 14. Depending on a desired application, the detector module 22 may be configured to measure various parameters in the environment 12. Examples of such parameters include temperatures, presence of gases, strains, pressures, vibration, and radiation among others.

The information developed by the detector module 22 may be communicated to an output 24 such as, a display or a wireless communication device. Advantageously, gleaned information, such as environmental or object conditions, may be employed to address any number of concerns or to effectuate changes in the environment or object 12 itself.

Figure 2:
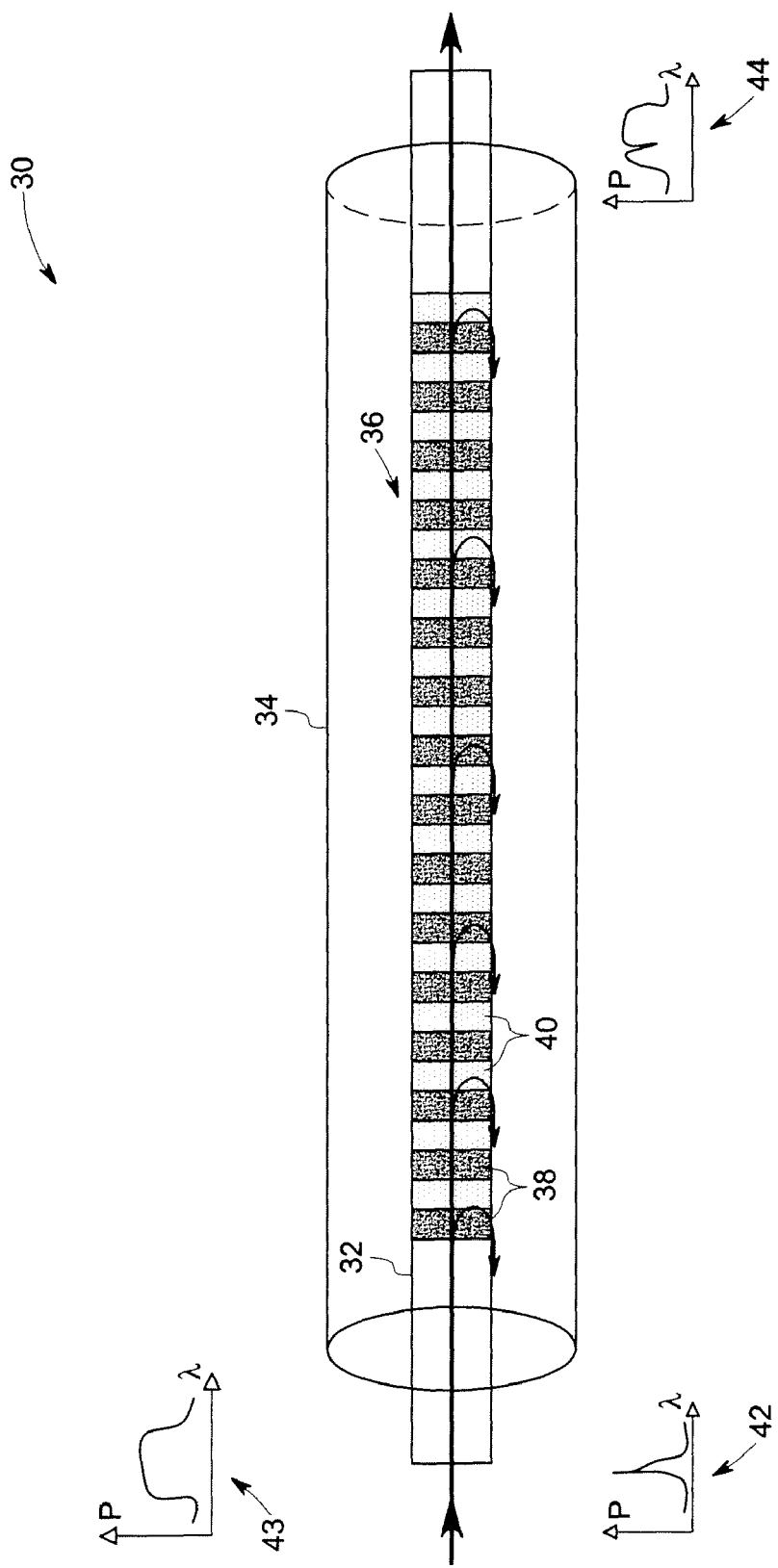
FIG. 2 is a diagrammatical illustration of an exemplary configuration of the fiber optic sensor employed in the sensing system of FIG. 1

FIG. 2 is a diagrammatical illustration of an exemplary configuration 30 of the fiber optic sensor 14 employed in the sensing system 10 of FIG. 1. The fiber optic sensor element 30 includes a fiber core 32 and a cladding 34 disposed about the fiber core 32. In this embodiment, the cladding 34 includes silicon dioxide with a fluorine or chlorine dopant. Advantageously, the dopants in the fiber cladding structure effectively reduce the refractive index of the silicon dioxide glass in an amount of about 0.2% to about 0.5% than that of the fiber core 32. In certain embodiments, the cladding 34 includes a doubled cladding structure having a first cladding of about 20 ppm to about 50 ppm fluorine or a chlorine doping structure having a 5 micrometers to about 20 micrometers radius and a second cladding of about 100 ppm to about 200 ppm fluorine or chlorine doping structure having a radius from 20 micrometers to about 62.5 micrometers. It should be noted that the first and second claddings provide a waveguide structure for light propagation along the fiber core 32 with negligible transmission loss even at elevated temperatures or in high radioactive environments.

Further, the fiber core 32 includes a series of grating elements 36 that are configured to reflect in phase wavelengths of light corresponding to a grating period of the grated elements 36. In this exemplary embodiment, the fiber core 32 includes a non-photosensitive fused quartz single mode fiber and the grating elements 36 include a periodic or a quasiperiodic modulated microcrystalline silicon dioxide tetrahedral grating structure. The non-photosensitive fused quartz single mode fiber used for the fiber core 32 facilitates elimination of intra-band impurity energy levels of silicon dioxide thereby preventing any carrier excitation movement from covalence band to conduction band at elevated temperatures and at certain levels of gamma-ray and hot neutron radiation environments.

The periodic or quasiperiodic modulated microcrystalline and silicon dioxide tetrahedral grating structure 36 is formed through the high power FL and phase mask inscribing technique followed by a thermal post-treatment process. In operation, a periodic or a quasiperiodic microcrystalline silicon dioxide structure 38 is inscribed on the fiber core 32 through the high power FL and phase mask inscribing technique. In this exemplary embodiment, the periodic or quasiperiodic microcrystalline silicon dioxide structure 38 is inscribed on the fiber core 32 using fast and local melting and quenching processes such that an elasto-optical coefficient of the fiber optic sensor 30 is independent of silicon dioxide cluster morphology. In addition, the high power laser pulse induces an effective refractive index modulation of an order of about 0.2-0.5% in the fiber core 32.

Further, an under-constrained silicon dioxide structure 40 composed of distorted short-range and dangling bonds is converted into an over-constrained silicon dioxide tetrahedral structure through a thermal post-treatment process. As used herein "over-constrained" means that the effective bonding number of the Si with oxygen atoms is greater than 2, or in some more specific embodiments, greater than 2.5, in the higher refractive index areas (shown by element number 38) so that the fiber material has become more compact relative to the amorphous network of silicon dioxide (in the areas shown by element number 40). In one exemplary embodiment, thickness of grating blocks of the under-constrained and over-constrained silicon dioxide structure is about 0.25 micrometers along the fiber axis and has a diameter of about 9 micrometers. The alternating modulated microcrystalline silicon dioxide and over-constrained silicon dioxide blocks effectively form a mass density modulation that introduces an effective refractive index modulation as being a light reflector for constructive light interference at each block interface. The conversion of the under-constrained silicon dioxide structure 40 to the over-constrained silicon dioxide tetrahedral structure is achieved through isothermal and isochronal processes. Beneficially, the transformation to an over-constrained (or "rigid") silicon dioxide tetrahedral structure facilitates operation of the fiber optic sensor 30 (shown in FIG. 2) at elevated temperatures and radiations. However, there may be some lower temperature applications that do not require the structure be over-constrained. Further, the modification of the fiber material microstructure through the isothermal process reduces a grain size distribution and a grain boundary density in the microcrystalline grating structure 36. The reduction in the grain size distribution substantially reduces a residual strain in between the fiber core 32 and cladding interface 34 thereby enhancing the transmission properties of the fiber optic sensor 30.

During operation, an input broadband light signal 43 is provided to the fiber optic sensor 30 by the light source 18 (see FIG. 1) and a portion of the input broadband light signal 42 is reflected by a respective grating element 36 in phase and corresponding to certain wavelengths of light, while remaining wavelengths are transmitted as represented by a transmitted signal 44. The reflection spectrum generated from the grating elements 36 facilitates simultaneous detection of plurality of parameters of the environment 12 (see FIG. 1). Examples of such parameters include dynamic strain, radiation, vibration and temperature. Further, the periodic or quasiperiodic modulated microcrystalline and silicon dioxide tetrahedral grating structure 34 described above reduces the thermo-optical effect fluctuation in the fiber optic sensor 30 thereby enabling detection of multiple parameters in high temperature environments with highly thermal stability. In one exemplary embodiment, the fiber optic sensor 30 is operable to detect a plurality of parameters in an environment having a temperature of about 800° C. The grating structure and packaging material of the fiber optic sensor 30 described above may be selected based upon measurement of desired parameters of an environment.

FIG. 3 is a diagrammatical illustration of an exemplary configuration 50 of a single fiber Bragg grating sensor package for measuring dynamic strain and vibration of an environment. As illustrated, the sensor package 50 includes the fiber optic sensor 30 having the fiber core 32 and the cladding 34 disposed about the fiber core 32. Further, the sensor package 50 includes single-mode fiber Bragg grating elements 52 that are inscribed on the fiber core 32 by, for example, using the high power FL and phase mask inscribing technique followed by a thermal post-treatment process, as described above with reference to FIG. 2. The Bragg grating elements 52 facilitate detection of a parameter such as strain or vibration in an environment. In this exemplary embodiment, the fiber optic sensor 30 is packaged within a Quartz or Sapphire capillary tubing 54. In addition, a metallized fiber layer 56 and high temperature ceramic or polymeric adhesive materials 58 are utilised for packaging the sensor 30 thereby enabling use of the sensor in high temperature and radioactive and corrosive environments.

FIG. 4 is a diagrammatical illustration of an exemplary configuration 70 of a temperature compensated Bragg grating sensor package for measuring strain and vibration in an environment. As with the sensor package 50 illustrated in FIG. 3, the temperature compensated sensor package 70 includes the fiber core 32 and the cladding 34 disposed within the quartz or sapphire capillary tubing 54. In this exemplary embodiment, the sensor package 70 includes an additional set of Bragg grating elements 72 for facilitating simultaneous detection of temperature along with the strain/vibration detection. Again, the packaging material includes high temperature ceramic or polymeric adhesive materials 58 disposed about the Bragg grating elements 52 and 72 for use in high temperature and radioactive and corrosive environments.

As will be appreciated by one skilled in the art a plurality of sensor package materials may be employed to package the fiber optic sensor 30 based upon the environmental conditions of the environment where the sensor 30 will be employed. The package materials may be selected based upon harsh environmental sensing requirements for parameters such as temperature, pressure, vibration corrosion, gamma and neutron radiation dosages. Such fiber sensor package materials include adhesives and encapsulation materials and fiber protection materials. Exemplary adhesives and encapsulation materials include silicon adhesives, high temperature bonder such as Nylon bonder, high temperature epoxies and ceramic adhesives. Exemplary fiber protection materials include carbon, polyimide polymer and silicones. Other package materials include pure quartz capillary, glass waveguide and alumina tube and sapphire capillary. In certain embodiments, such as for high temperature environments having temperature of about 500° C. to about 800° C., materials such as stainless steel, Inconel™ may be employed as the package material. Alternatively, for low temperature environments, materials such as aluminum, copper and stainless steel may be employed as the package material.

Figure 5:
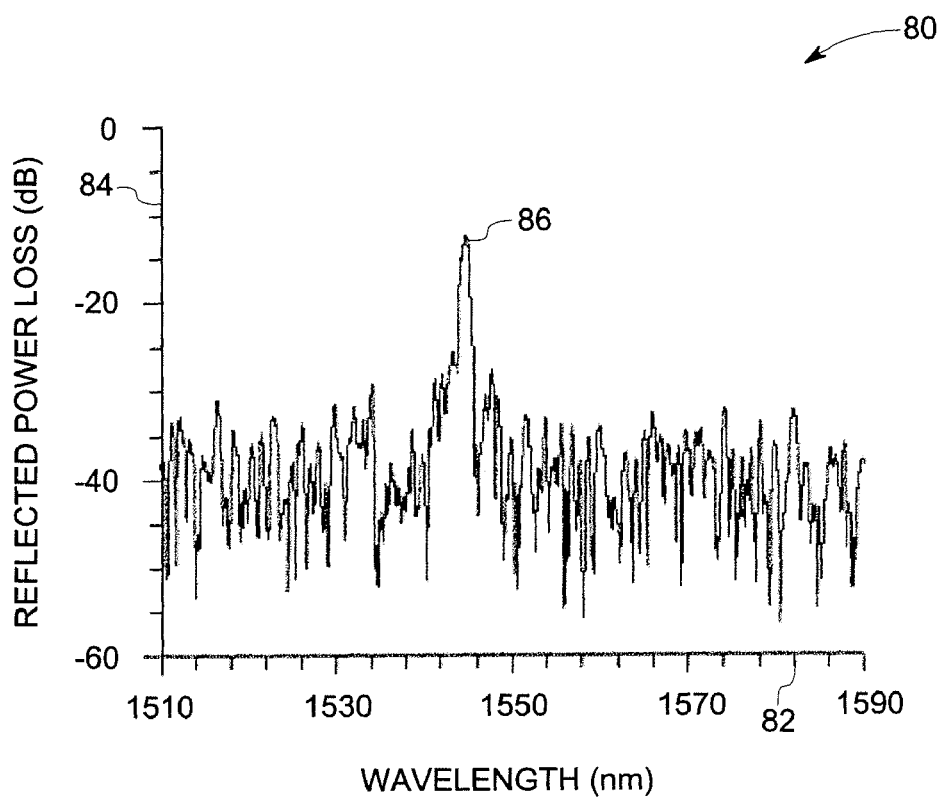
FIG. 5 is a graphical representation of an exemplary reflection spectrum obtained from the fiber optic sensor of FIG. 2.
Figure 6:
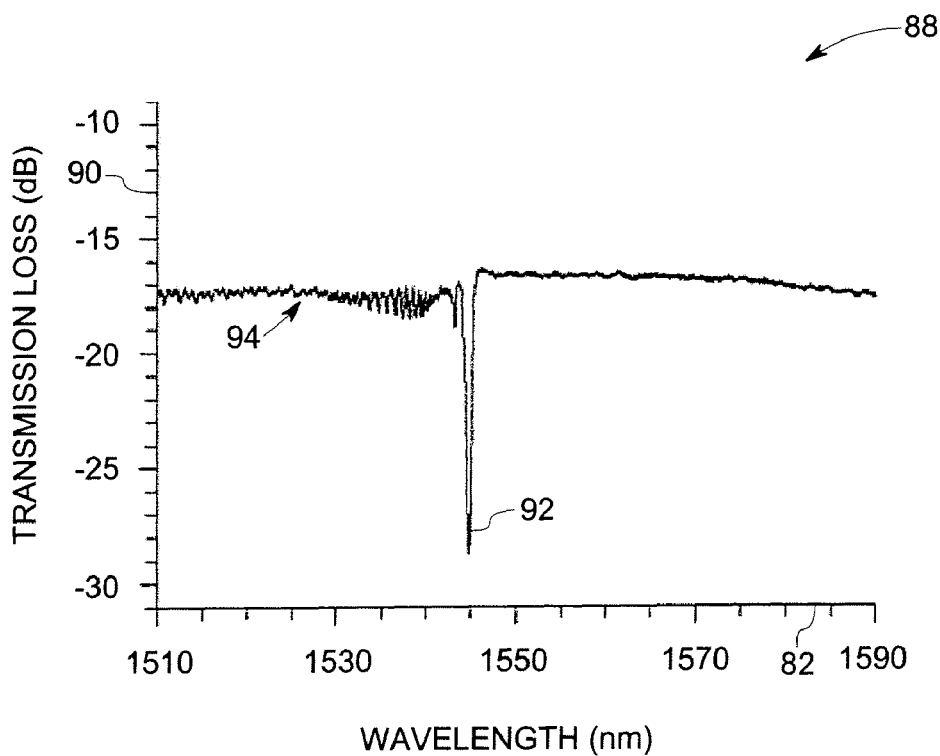
FIG. 6 is a graphical representation of an exemplary transmission spectrum 88 obtained from the fiber optic sensor of FIG. 2.

As described above, the reflection spectrum generated from the fiber optic sensor 30 is analyzed by the detector module 22 (see FIG. 1) for detection of at least one parameter of the environment 12 (see FIG. 1). FIG. 5 is a graphical representation of an exemplary reflection spectrum 80 obtained from the fiber optic sensor 30 of FIG. 2. In the illustrated embodiment, the abscissa axis 82 represents a wavelength measured in nanometers (nm) and the ordinate axis 84 represents a reflected power loss measured in decibels (dB) from a 800 nm femtosecond pulse laser inscribed Bragg grating on a pure quartz fiber. The peak reflected loss represented by reference numeral 86 corresponds to a fiber core guided mode of the fiber optic sensor 30. In this exemplary embodiment, the peak reflected loss is representative of structural strain, temperature and vibration. Further, the relative amplitude of the reflected peak is representative of the fiber sensor's health condition. FIG. 6 is a graphical representation of an exemplary transmission spectrum 88 obtained from the fiber optic sensor 30 of FIG. 2. In the illustrated embodiment, the abscissa axis 82 represents the wavelength measured in nanometers (nm) and the ordinate axis 90 represents a transmission loss measured in decibels (dB) from the 800 nm femtosecond pulsed laser inscribed Bragg grating on a pure quartz fiber. The peak transmission loss 92 corresponds to a fiber core guided mode of the fiber optic sensor 30 and the power transmission loss corresponding to cladding modes is represented by reference number 94. Again, the determination of a dip position of the transmission loss 90 is representative of the structural strain, temperature and vibration. Further, the relative amplitude of the transmission dip is representative of the fiber sensor's health condition.

Figure 7:
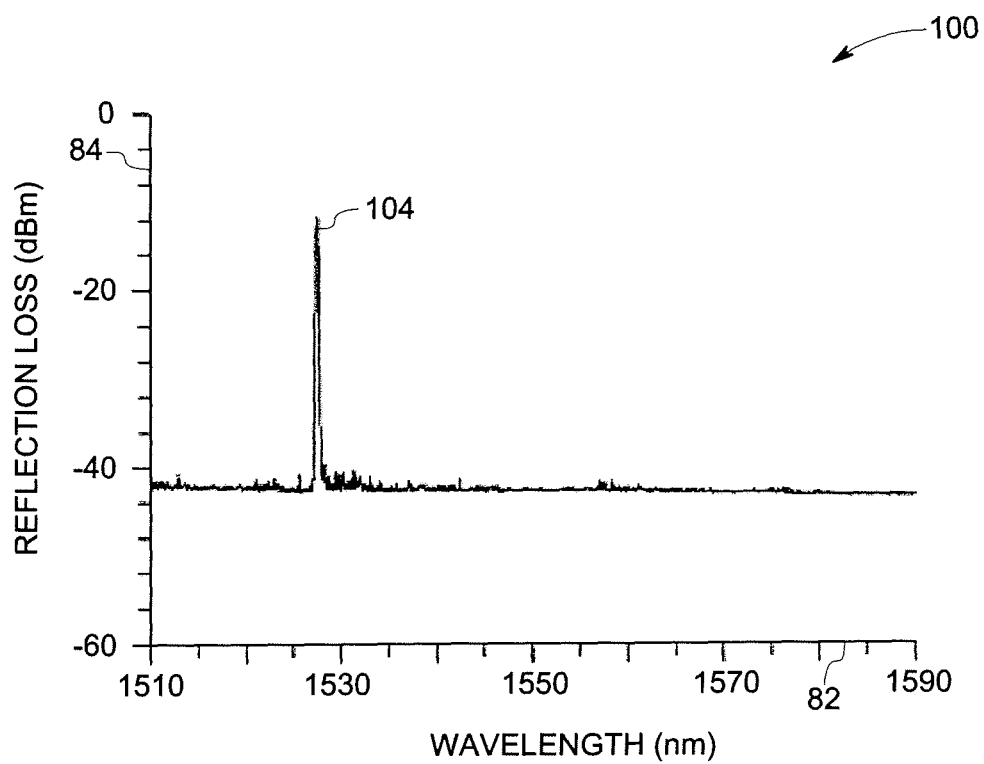
FIG. 7 is a graphical representation of exemplary reflection spectrum obtained from a FBG sensor fabricated with ultraviolet (UV) laser and phase mask inscribing technique on a photosensitive single-mode fiber.
Figure 8:
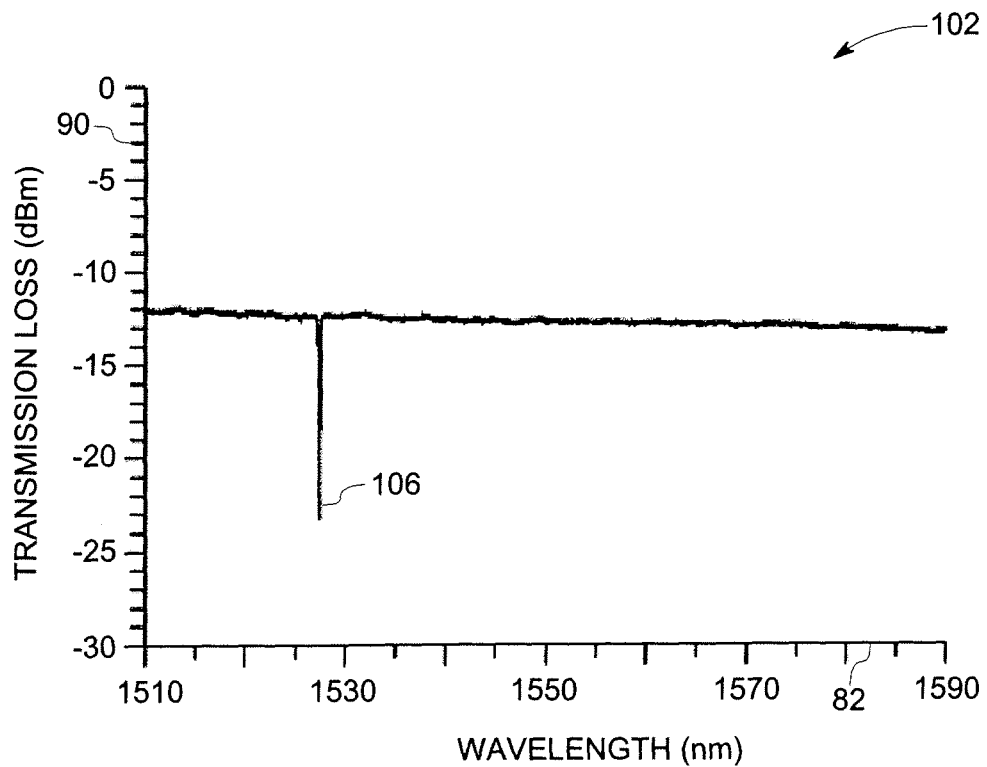
FIG. 8 is a graphical representation of exemplary transmission spectrum obtained from a FBG sensor fabricated with UV laser and phase mask inscribing technique on a photosensitive single-mode fiber.

FIGS. 7 and 8 are a graphical representation of exemplary reflection and transmission spectra 100 and 102 obtained from a FBG sensor fabricated with ultraviolet (UV) laser and phase mask inscribing technique. In the illustrated embodiment, the reflection and transmission losses 84 and 90 are obtained from a conventional FBG sensor that is inscribed with about 190 nm to about 250 nm UV laser light. Again, the peak reflected loss represented by reference numeral 104 corresponds to a fiber core guided mode of the sensor. Similarly, the peak transmission loss represented by reference numeral 106 corresponds to a fiber core guided mode of the sensor.

As illustrated, the sensor formed by the UV laser FBG inscription technique has about 30 dBm to about 40 dBm dynamic range from a reflected Bragg resonant peak and the sensor formed by the FL FBG inscription technique has about 10 dBm to about 20 dBm dynamic range from a reflected Bragg resonant peak. Further, the sensor formed by the UV laser FBG inscription technique has about 10 dBm to about 15 dBm dynamic ranges from a transmitted peak and the sensor formed by the FL FBG inscription technique has about 10 dBm to about 20 dBm dynamic ranges from a transmitted resonant peak. The fiber optic sensor 30 fabricated by the FL FBG inscription technique has comparable dynamic range to that of conventional FBG sensors fabricated by the UV laser inscription technique. In addition, inscription set up of the grating may be adjusted based upon a desired parameter.

Furthermore, the fiber optic sensor 30 formed by the high power FL FBG inscription technique followed by the thermal post-treatment process has relatively lesser temperature sensitivity as compared to the conventional UV laser fabricated sensors, thereby enabling the use of such a sensor 30 in dynamic temperature environments.

Figure 9:
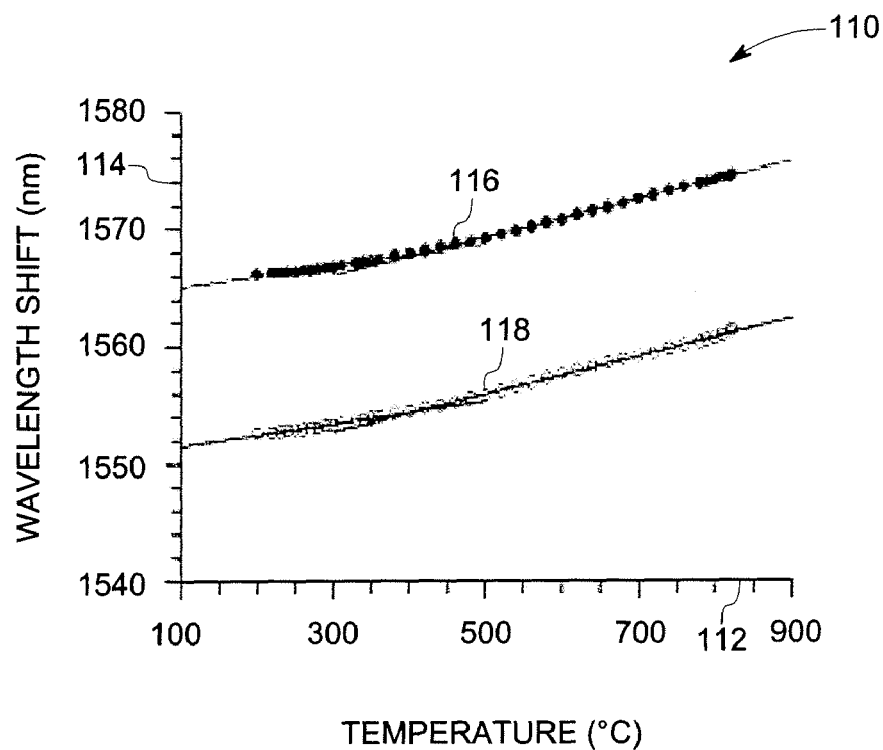
FIG. 9 is a graphical representation of exemplary thermal sensitivity results of a UV laser and phase mask technology fabricated FBG sensor on a photosensitive single-mode fiber.
Figure 10:
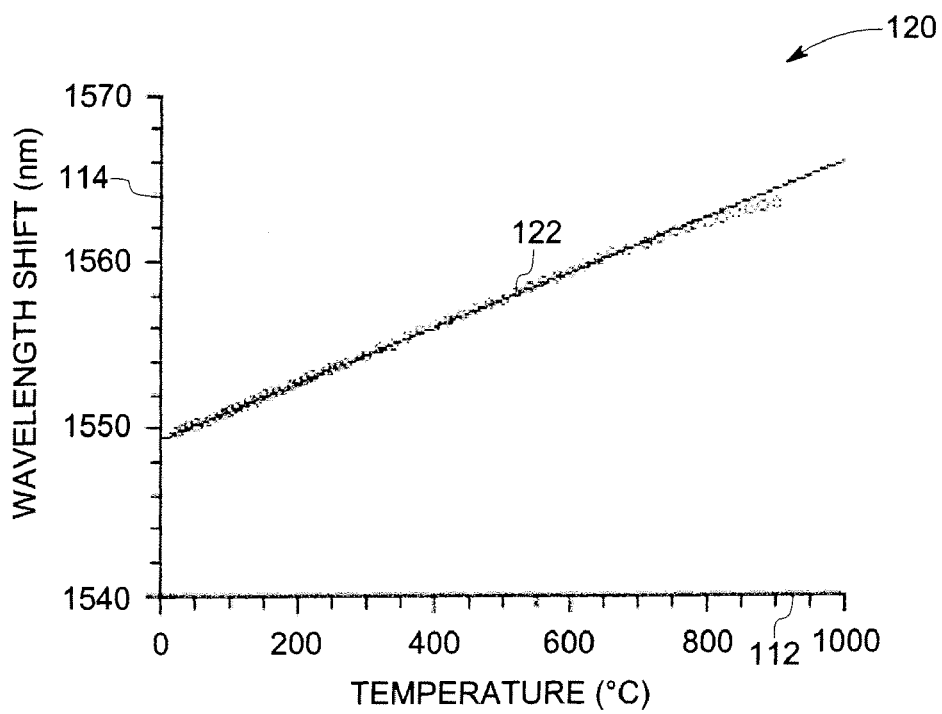
FIG. 10 is a graphical representation of thermal sensitivity results of a (femtosecond laser) FL fabricated FBG sensor on a photosensitive single-mode fiber.

FIG. 9 is a graphical representation of exemplary thermal sensitivity 110 results of a UV laser fabricated FBG sensor on a photosensitive fiber. The abscissa axis 112 represents a temperature measured in ° C. and the ordinate axis 114 represents a wavelength shift measured in nanometers (nm) obtained from the UV laser fabricated FBG sensor. In this exemplary embodiment, the wavelength shift for a UV laser fabricated Germanium (Ge) doped FBG sensor is represented by profile 116 and the wavelength shift for a UV laser fabricated Germanium (Ge) and Fluorine (F) co-doped FBG sensor is represented by profile 118. As illustrated, the thermal sensitivity of the Ge doped and Ge/F co-doped FBG sensors is about 9 pm/° C. to about 11 pm/° C. FIG. 10 is a graphical representation of thermal sensitivity 120 results of a FL FBG fabricated FBG sensor on a photosensitive fiber. In this exemplary embodiments, the wavelength shift for a 800 nm pulsed laser inscribed FBG sensor fabricated on a photosensitive fiber is represented by profile 122. As can be seen, the thermal sensitivity of such femtosecond pulsed FBG sensor is about 16.5 pm/° C. which is greater than the thermal sensitivity of the UV laser fabricated FBG sensor on the photosensitive fiber as described above with reference to FIG. 9.

Figure 11:
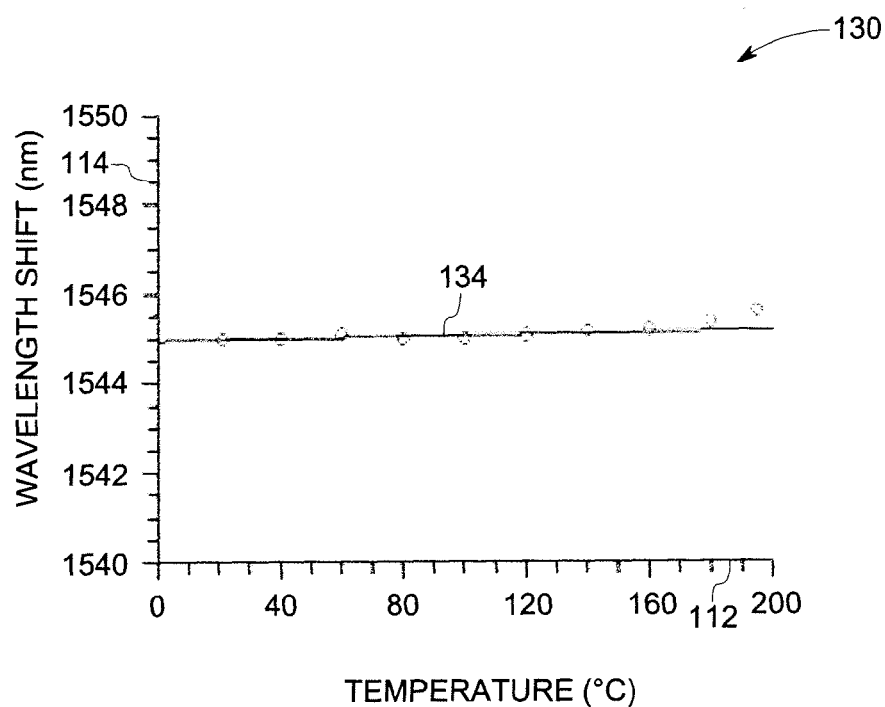
FIG. 11 is a graphical representation of thermal sensitivity results of a FL inscribed FBG sensor fabricated on a fused quartz fiber for a temperature range of about 0° C. to about 200° C.
Figure 12:
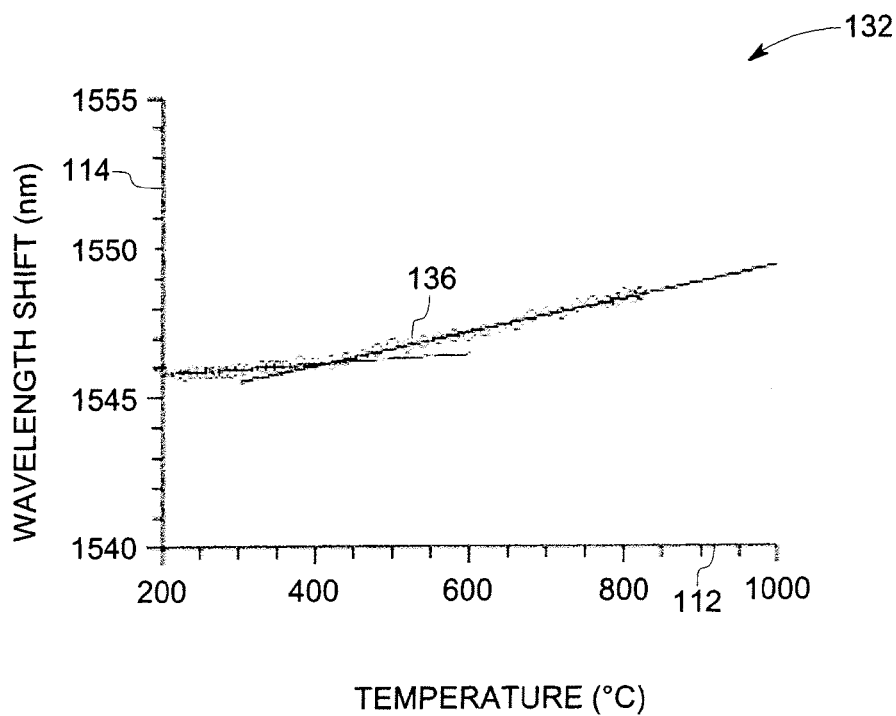
FIG. 12 is a graphical representation of thermal sensitivity results of a FL inscribed FBG sensor fabricated on a fused quartz fiber for a temperature range of about 200° C. to about 850° C. respectively.

FIGS. 11 and 12 are a graphical representation of thermal sensitivity results 130 and 132 of a FL inscribed FBG sensor fabricated on a fused quartz fiber for a temperature range of about 0° C. to about 200° C. and 200° C. to about 850° C. respectively. In this exemplary embodiment, profiles 134 and 136 represents the wavelength shift for a 800 nm pulsed femtosecond laser inscribed Bragg grating on a fused quartz fiber. As illustrated, the thermal sensitivity of the FL fabricated FBG sensor is about 1.1 pm/° C. at a temperature of about 150° C. and about 1.7 pm/° C. at temperatures in a range of about 150° C. to about 400° C. Thus, the sensors fabricated via the high power FL FBG inscribing technique as described above have substantially less thermal sensitivity as compared to the UV laser fabricated FBG sensors on photosensitive fibers thereby making them suitable for strain sensing in dynamic temperature environmental structural health monitoring.

Figure 13:
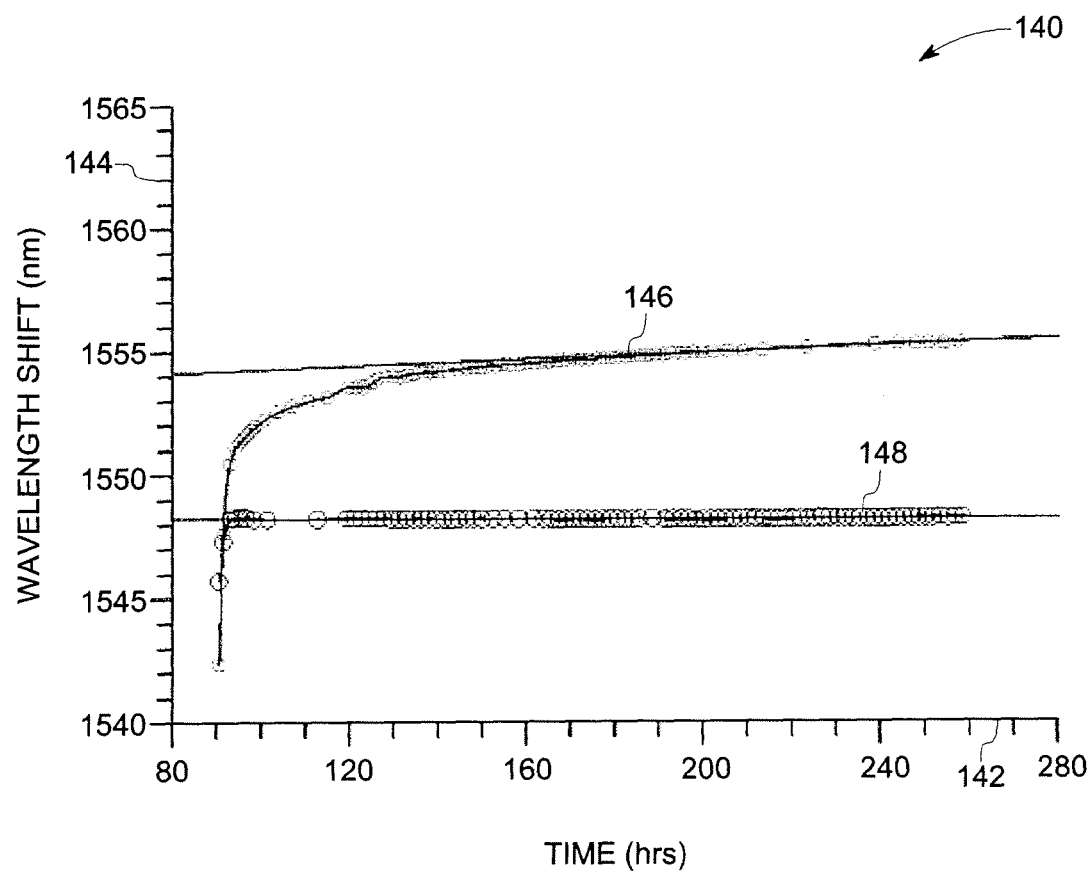
FIG. 13 is a graphical representation of exemplary fiber sensor wavelength thermal stability results of UV laser fabricated FBG on a photosensitive single-mode fiber and FL fabricated FBG sensor on a quartz single-mode fiber, where the temperature was started from 200° C. and kept at 822° C.

Further, the fiber optic sensor 30 has relatively better wavelength thermal stability as compared to conventional UV laser fabricated FBG sensors. FIG. 13 is a graphical representation of exemplary fiber sensor wavelength thermal stability results 140 of UV laser and FL fabricated FBG sensors at about 822° C. The abscissa axis 142 represents a test time measured in hours (hrs) and the ordinate axis 144 represents a wavelength shift measured in nm. In this exemplary embodiment, profile 146 represents the thermal stability of a Ge/F co-doped FBG sensor and profile 148 represents the thermal stability of a FL inscribed FBG sensor. The thermal stability of the Ge/F co-doped FBG sensor is about 6.9 pm/hr achieved at about 200 hrs of annealing time which is indicative of strong atoms diffusion dynamics of the Ge/F co-doped FBG. Further, the thermal stability of the FL FBG based sensor is about −0.18 pm/hr which is indicative of condensation dynamics of a compacted tetrahedral silicon dioxide FBG microstructure induced by temperature. Thus, the thermal stability of the FL FBG based sensor is about 38 times better than the thermal stability of a Ge/F co-doped FBG based sensor.

Figure 14:
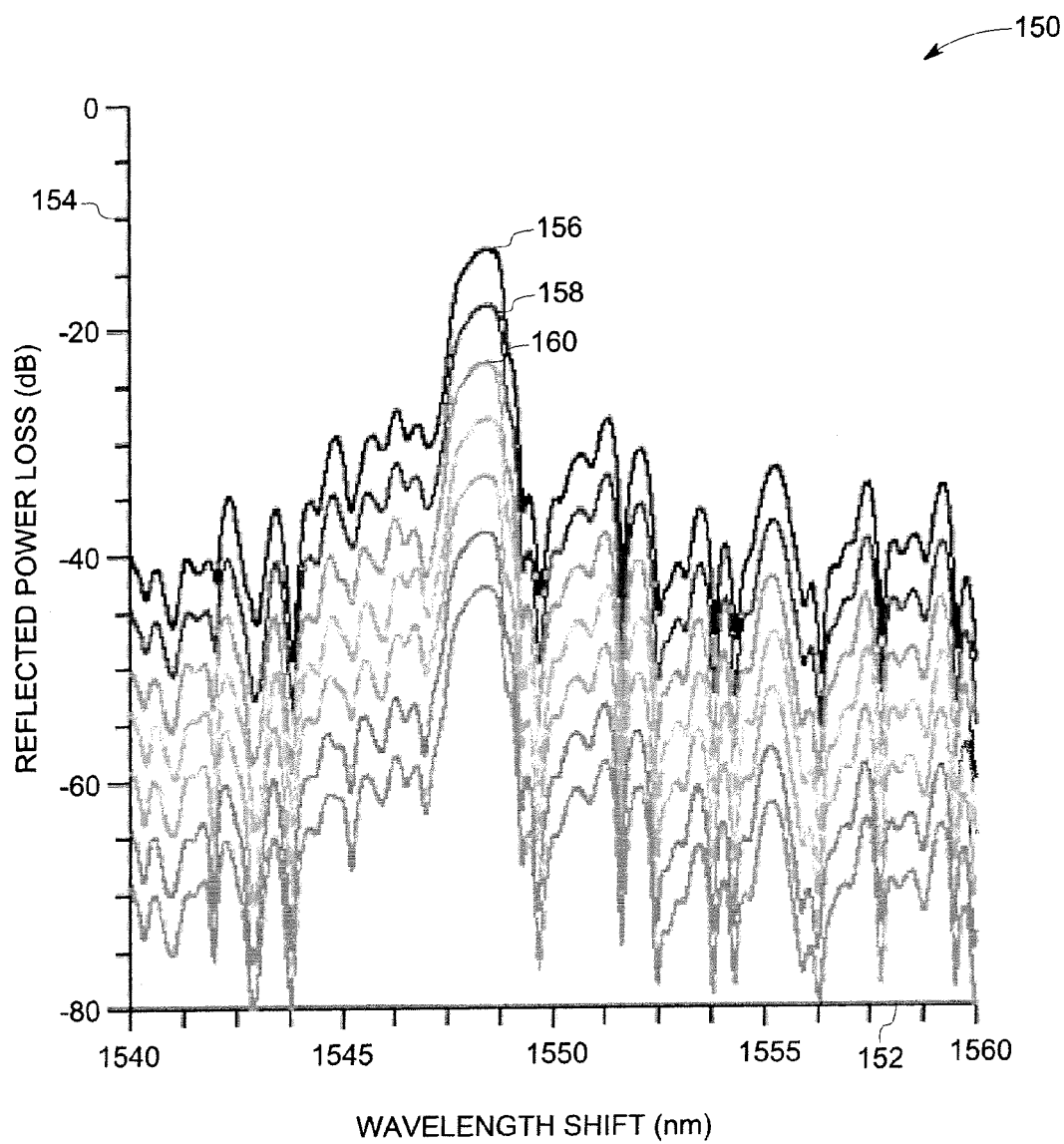
FIG. 14 is a graphical representation of exemplary reflected power loss thermal response of the FL fabricated FBG sensor subjected to isothermal tests at different time periods.
Figure 15:
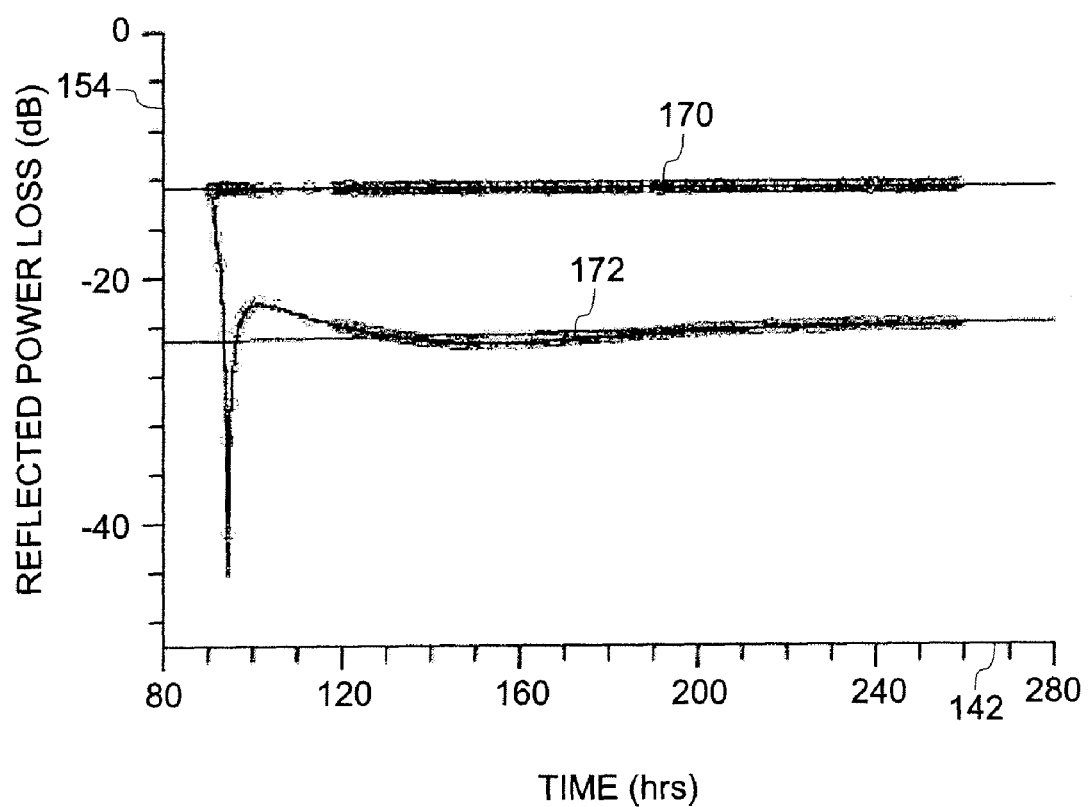
FIG. 15 is a graphical representation of reflected power loss results of the UV laser and FL fabricated FBG sensors plotted as a function of the testing time.

FIG. 14 is a graphical representation of exemplary reflected power loss thermal response 150 of the FL fabricated FBG sensor subjected to isothermal tests at different time periods at about 820° C. in accordance with aspects disclosed herein. The abscissa axis 152 represents the wavelength shift measured in nm and the ordinate axis 154 represents a reflected power loss measured in dB. Profiles such as represented by reference numerals 156, 158 and 160 represent the reflected power loss at different test times. For example, 156, 158 and 160 represent the power loss at 0, 1.5 and 5 hrs of test time respectively. In this exemplary embodiment, each of the spectrum is down shifted by about 5 dB for clarity. The reflected power loss 154 of the FL fabricated FBG sensor is plotted as a function of the test time 142 in FIG. 15. In this exemplary embodiment, profiles 170 and 172 represent the reflected peak power of the FL fabricated FBG sensor on a non-photosensitive fiber and of a $GeO_2$ doped FBG based sensor respectively. The reflected power loss of the $GeO_2$ doped FBG based sensor has instability of about 7.6 dB/khr and that of the FL fabricated FBG sensor is of instability of about 0.065 dB/khr. Thus, the thermal drifting of the FL fabricated FBG sensor described above is substantially better than that of the $GeO_2$ doped FBG based sensor thereby making such sensors more reliable for use in harsh environments.

Figure 16:
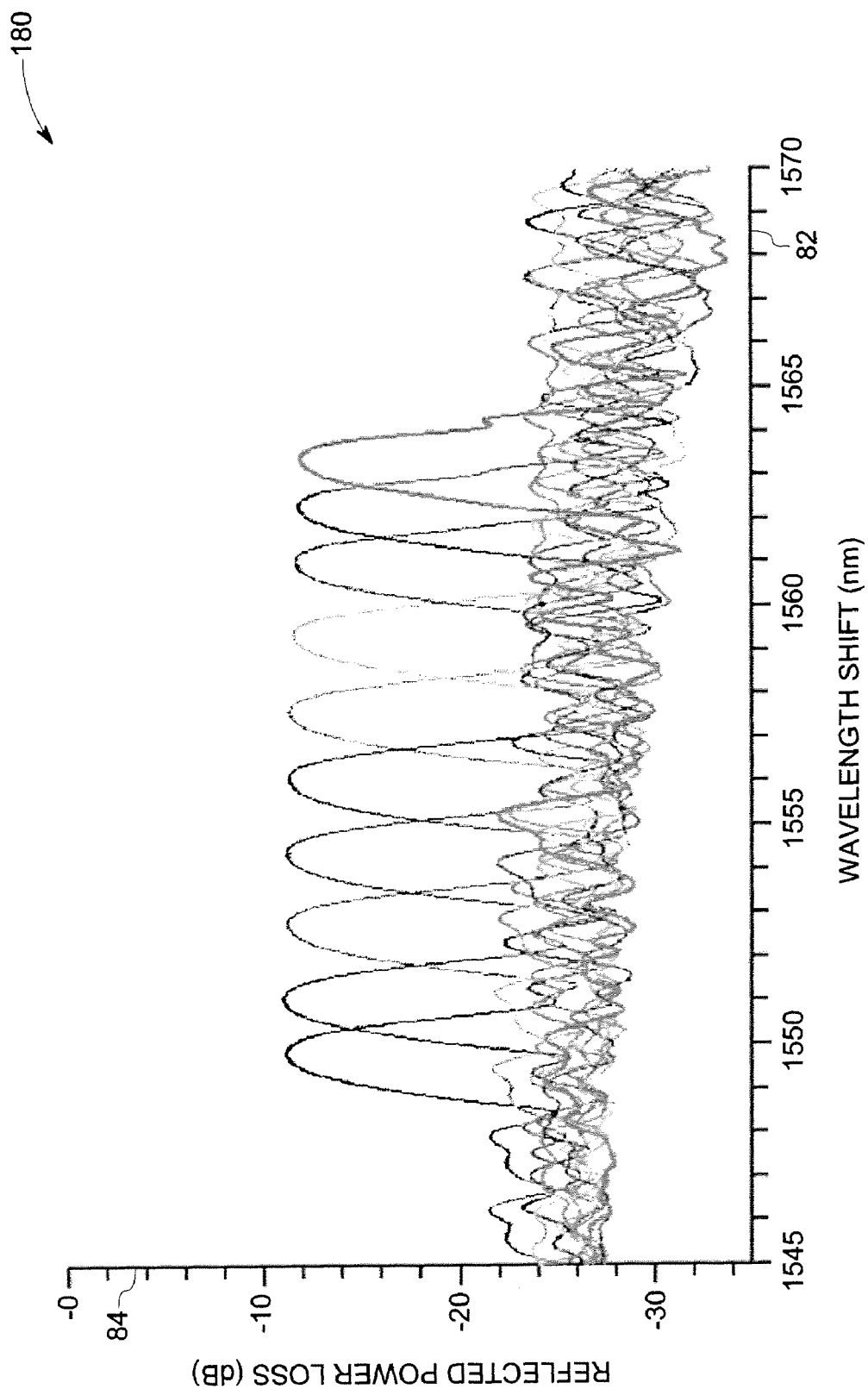
FIG. 16 is a graphical representation of exemplary reflected spectrum from a FL fabricated FBG sensor at different temperatures.
Figure 17:
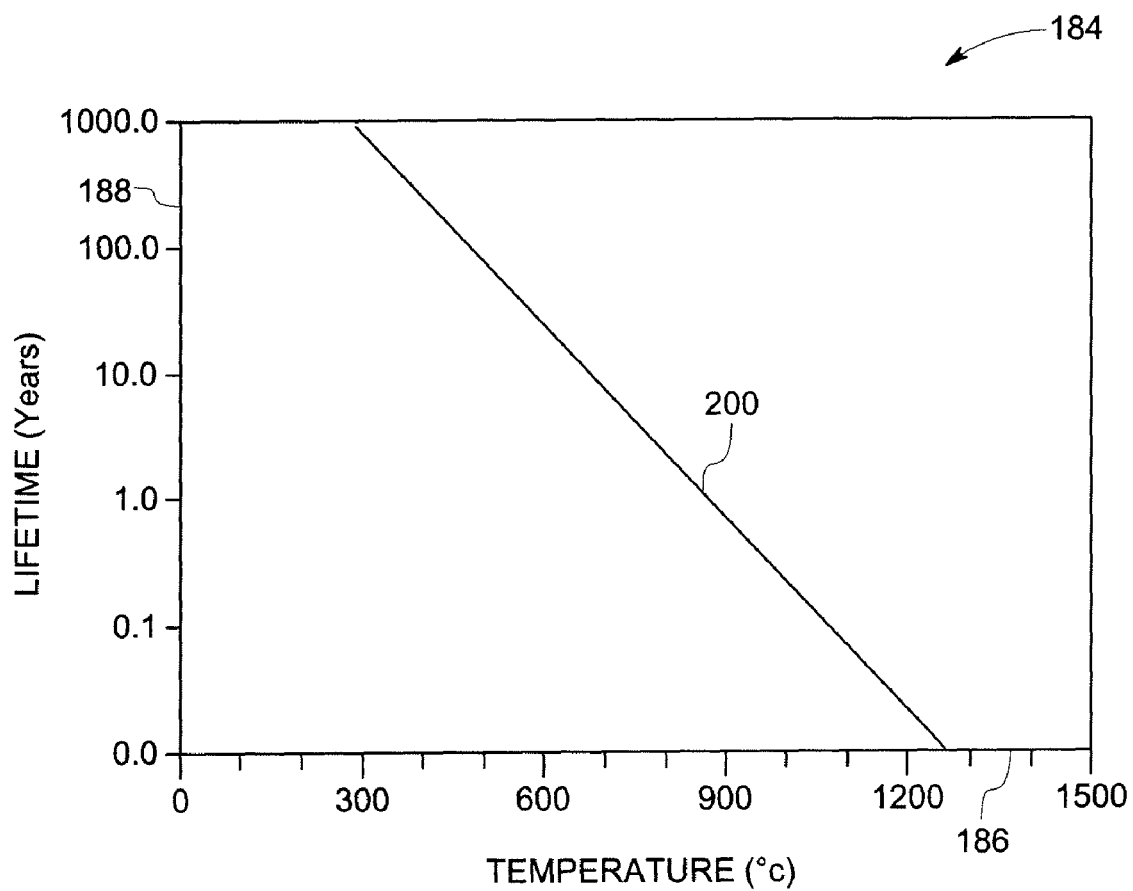
FIG. 17 is a graphical representation of lifetime estimation with respect to operational temperature of an exemplary FL FBG sensor.

FIG. 16 is a graphical representation of exemplary reflected power loss thermal response 180 of the FL fabricated FBG sensor for a temperature range of about 20° C. to 900° C. in accordance with aspects of the present invention. The abscissa axis 82 represents a wavelength shift measured in nm and the ordinate axis 84 represents a reflected power loss measured in dB. FIG. 17 is a graphical representation of FL sensor lifetime estimation 184 with respect to temperature. As illustrated, the abscissa axis 186 represents a temperature and the ordinate axis 188 represents estimated lifetime of the sensor. In the illustrated embodiment, the variation in the estimated lifetime of the sensor with respect to the temperature is represented by profile 200. It should be noted that the lifetime 188 is calculated based on the sensor thermal drifting value measured for a time period of about of 100 hours to about 200 hours within a 40 nm dynamic range, and without considering the sensor package reliability and lifetime. As can be seen, the extrapolated upper limit of the environmental temperature from a FL FBG sensor prototype is around 1250° C.

Figure 18:
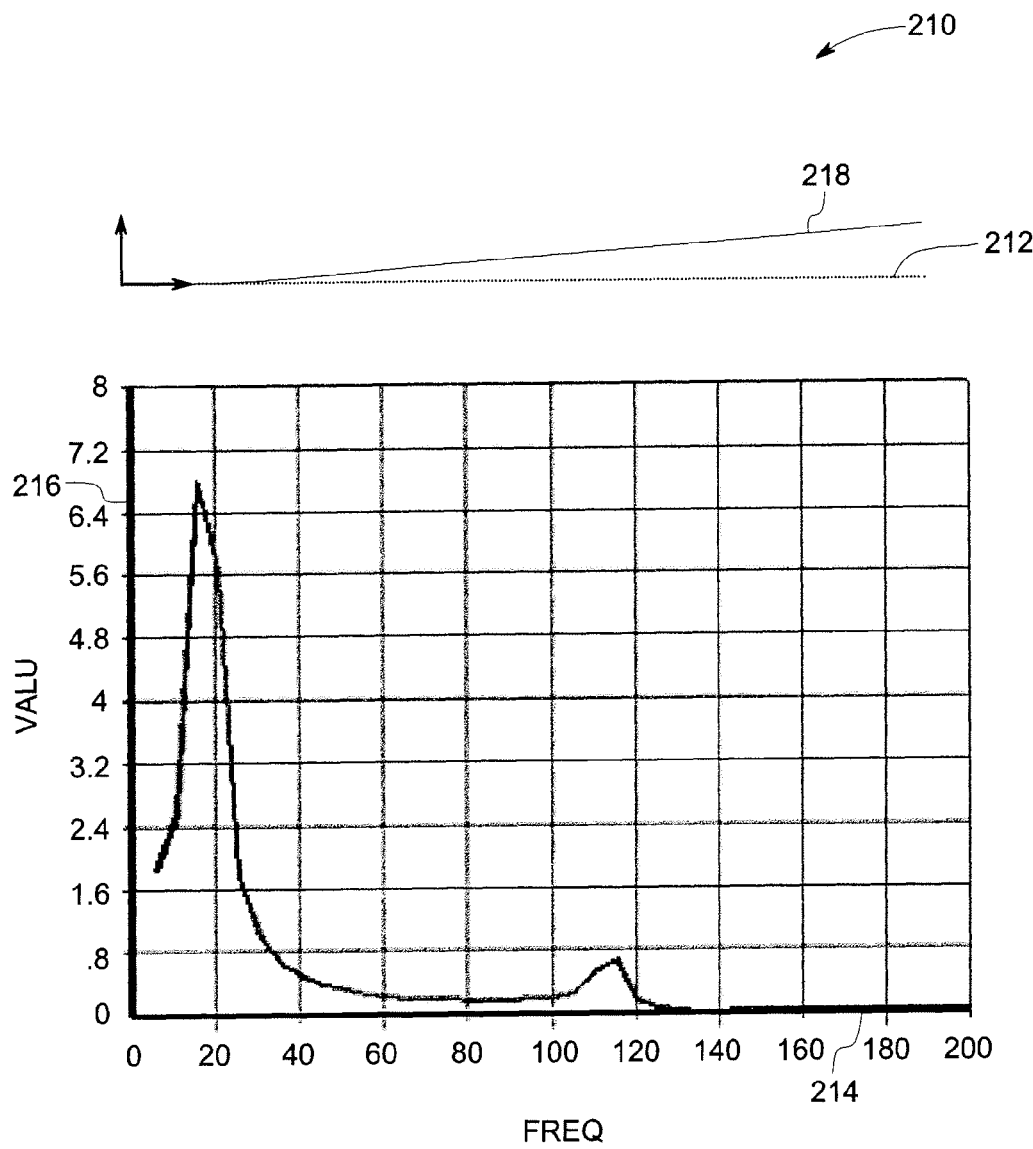
FIG. 18 is a graphical representation of fundamental flexural vibration mode results of low frequency, obtained for an exemplary cantilever beam using the fiber optic sensor of FIG. 2.

FIG. 18 is a graphical representation of fundamental vibration mode results 210 of low frequency obtained for an exemplary cantilever beam 212 using the fiber optic sensor 30 of FIG. 2 in accordance with aspects disclosed herein. The abscissa axis 214 represents a frequency and the ordinate axis represents the displacement 216 of the cantilever beam. In this exemplary embodiment, the fiber optic sensor 30 (see FIG. 2) having a periodic or quasiperiodic modulated microcrystalline and silicon dioxide tetrahedral grating structure is employed to detect the displacement corresponding to a fundamental flexural mode 218 of the cantilever beam at a beam starting point. As described earlier, an input broadband light signal 42 (see FIG. 2) is provided to the fiber optic sensor 30 and a portion of the input broadband light signal 42 is reflected by a respective grating element 36 in phase and corresponding to certain wavelengths of light, while remaining wavelengths are transmitted as represented by a transmitted signal 44 (see FIG. 2). The reflection spectrum generated from the grating elements 36 facilitates detection of displacement 216 corresponding to the fundamental mode 218 of the cantilever beam. Further, based upon the package method of the grating elements 36 other parameters may be detected.

Figure 19:
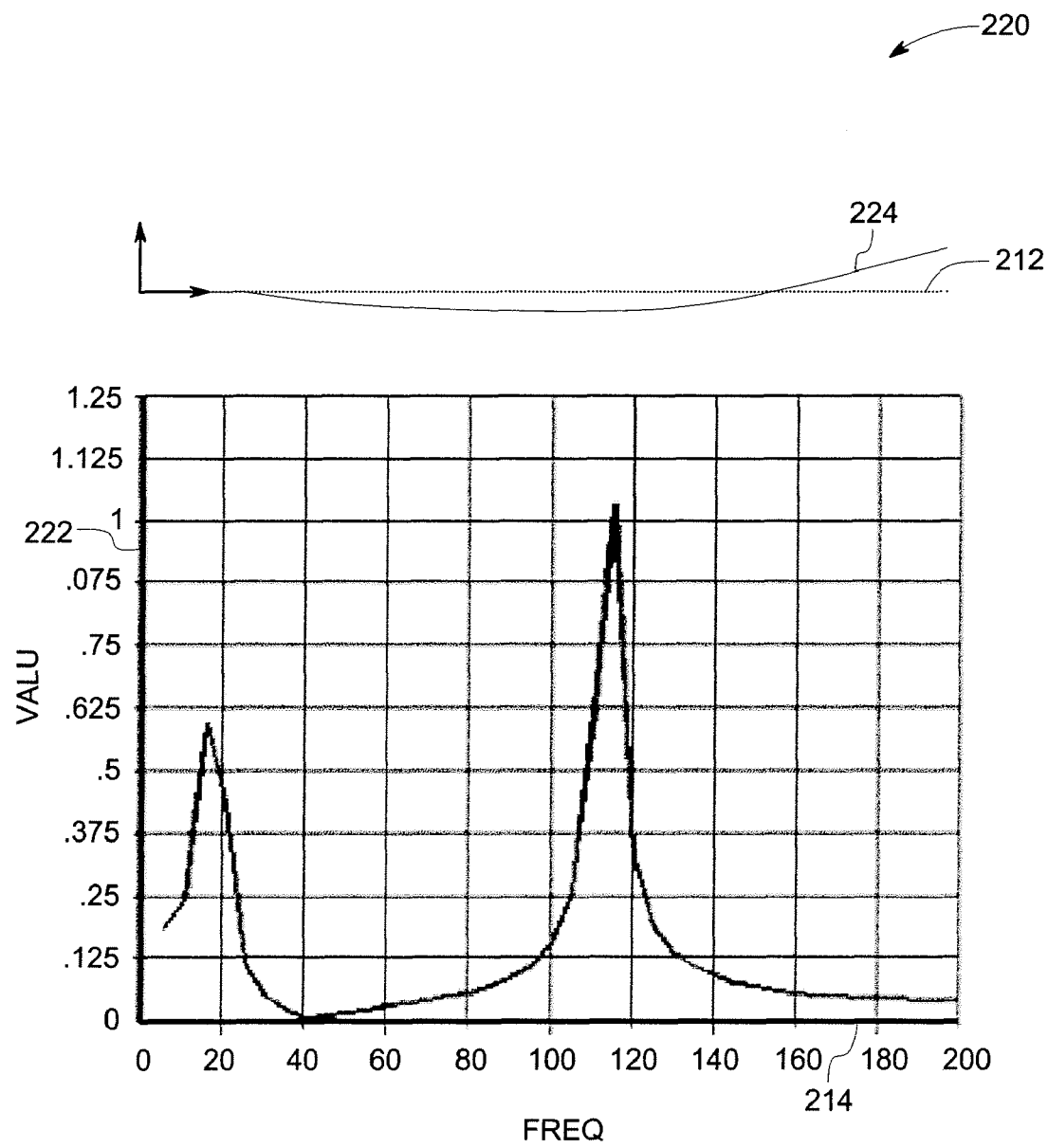
FIG. 19 is a graphical representation of multi-vibration mode results obtained for the exemplary cantilever beam using the fiber optic sensor of FIG. 2.

FIG. 19 is a graphical representation of multi-vibration mode results obtained for the exemplary cantilever beam 212 using the fiber optic sensor 30 of FIG. 2, in accordance with aspects disclosed herein. In the illustrated embodiment, the fiber optic sensor 30 is configured to measure strain 222 corresponding to a bending mode 224 of the cantilever beam 212 based upon a reflection spectrum generated from the grating elements 36 of the fiber optic sensor 30 from the middle of the beam. Thus, the fiber optic sensor 30 facilitates simultaneous detection of a plurality of parameters of an environment based upon a reflection spectrum generated from the sensor 30. Further, as described above, the fiber optic sensor 30 includes a non-photosensitive fused quartz single mode fiber core and a periodic or a quasiperiodic modulated microcrystalline and silicon dioxide tetrahedral grating structure that reduces the thermo-optical effect fluctuation in the fiber optic sensor 30 thereby enabling reliable detection of multiple parameters in harsh environments.

Figure 20:
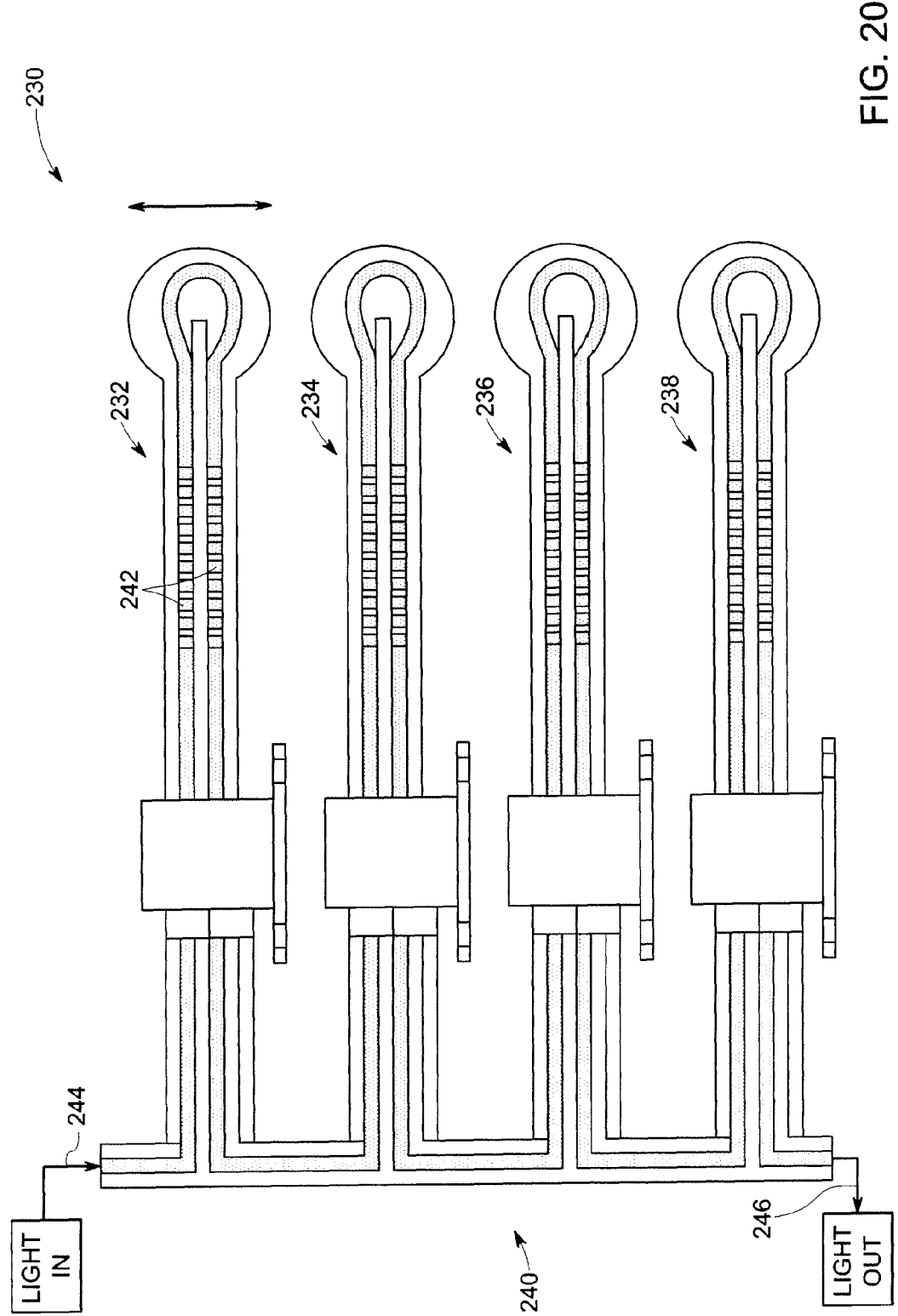
FIG. 20 illustrates an exemplary single axis temperature, dynamic strain, and vibration fiber optic sensing system 230 for detecting multiple parameters of an environment.

The fiber optic sensor 30 described above may be employed for sensing multiple parameters in a distributed environment. FIG. 20 illustrates an exemplary single axis dynamic strain/vibration fiber optic sensing system 230 for detecting multiple parameters of an environment in accordance with aspects disclosed herein. In the illustrated embodiment, the sensing system 230 includes a plurality of sensors such as represented by reference numerals 232, 234, 236 and 238 disposed on a distributed cable 240. In one exemplary embodiment, the distributed cable includes a stainless steel packaged fiber cable. Further, each of the plurality of sensors 232, 234, 236 and 238 includes a non-photosensitive fused quartz single mode fiber core having a periodic or a quasiperiodic modulated microcrystalline and silicon dioxide tetrahedral grating structure 242 to facilitate simultaneous detection of multiple parameters of the environment. In this embodiment, the grating structure 242 facilitates detection of strain/vibration in the environment. Further, data regarding different locations of the environment can be obtained by evaluating the changes in the diffraction peaks reflected by the various sensors 232, 234, 236 and 238. In another embodiment, the distributed fiber optic sensing system 230 includes a plurality of sensors having a fiber core with Gaussian apodized or Cosine apodized grating structure and a cladding disposed about the fiber core.

The distributed fiber sensing system 230 may be placed in an environment for detecting parameters of environment such as temperature, strain and so forth. In operation, the distributed fiber sensing system 230 is illuminated by a light source as represented by the reference numeral 244. This illumination facilitates the generation of reflected signals corresponding to a grating period of the gratings 242 of the sensors 232, 234, 236 and 238 while remaining wavelengths are transmitted as represented by a transmitted signal 246. The respective reflective and transmitive signals may be directed to an optical spectral analyzer (not shown). Further, in certain embodiments, a coupler (not shown) may be coupled to the light source and to the optical spectral analyzer to combine the input and reflected signals. The optical spectral analyzer measures the wavelength spectrum and intensity of the received signals to estimate a parameter such as strain/vibration of the environment. It should be noted that the distributed fiber sensing system 230 employs a differential configuration for measuring parameters of an environment.

Advantageously, the number of sensors employed in the module 230 may be dynamically increased or reduced based upon a desired parameter of the environment. Further, the grating structure 242 may be selected based upon desired parameters to be measured. As will be appreciated by one skilled in the art a plurality of sensor module designs may be envisaged based upon desired parameters to be measured for an environment.

Figure 21:
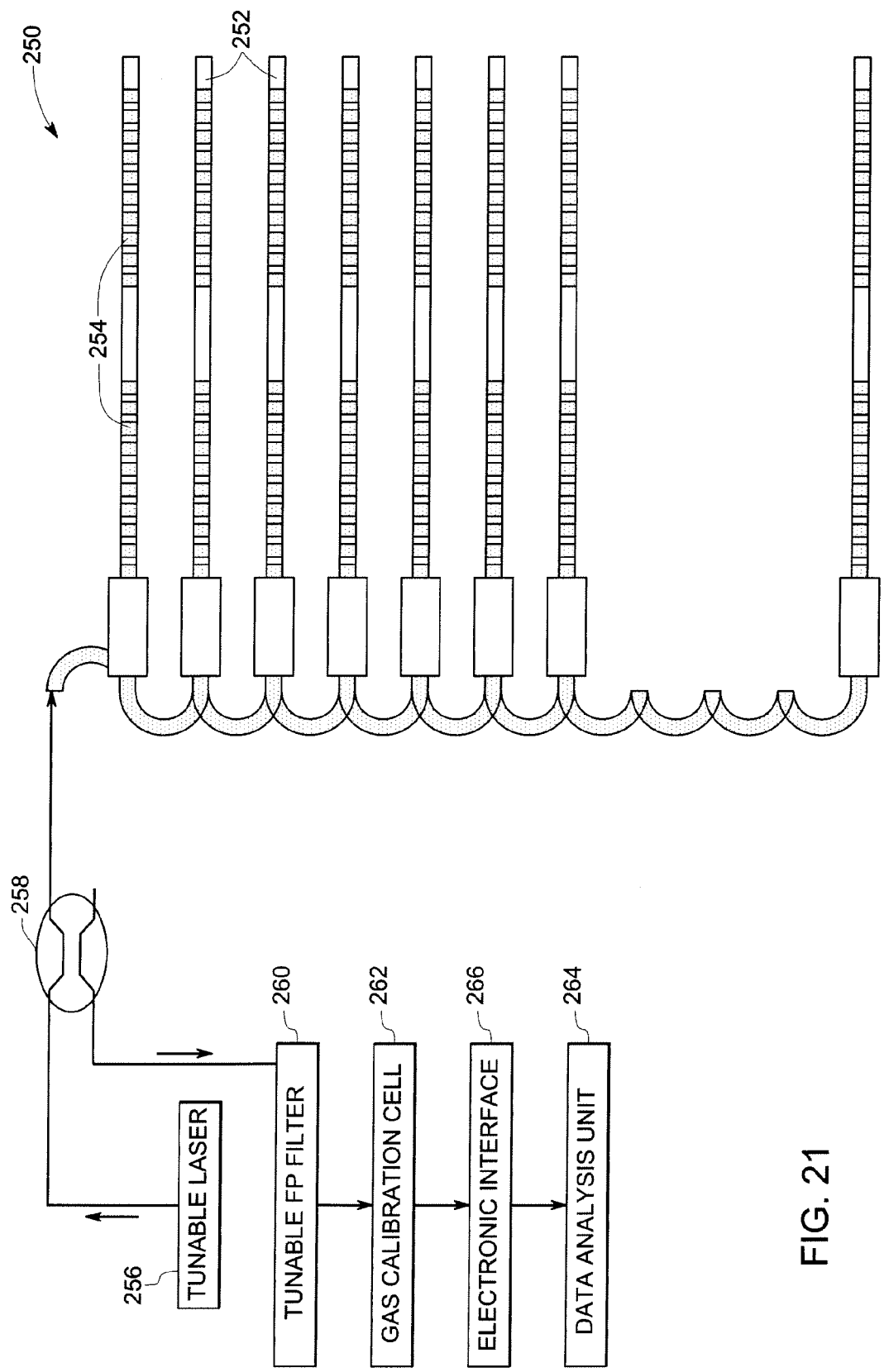
FIG. 21 is a diagrammatical illustration of an exemplary fiber optic dynamic sensing system in reflection configuration in accordance with aspects disclosed herein.

As described earlier, a plurality of parameters are detected using the fiber optic sensor based upon the reflective spectrum generated from the fiber optic sensor. FIG. 21 is a diagrammatical illustration of an exemplary fiber optic dynamic sensing system 250 in reflection configuration in accordance with aspects disclosed herein. The fiber optic sensing system 250 includes a plurality of fiber optic sensors such as represented by reference numeral 252, each sensor 252 having a periodic or quasiperiodic modulated microcrystalline and silicon dioxide grating structure 254 for detecting a plurality of parameters of an environment. Further, the sensing system 250 includes a tunable laser 256 that functions as an optical source for interrogating a reflectivity spectrum generated from the grating structure 254 of each of the sensors 252. A 2×1 optical coupler 258 is coupled to the tunable laser 256 the sensors 252 for managing incoming light from the tunable laser 256 as well as the reflected signals from each of the sensors 252.

Further, a tunable Fabry-Perot (FP) filter 260 is employed to detect Bragg wavelength shifts from each of the sensor 252 for detecting a parameter of the environment. The sensing system 250 also includes a gas calibration cell 262 to enable absolute wavelength measurement and to enable compensation for variations in the tunable laser scan speed. In one embodiment, the gas calibration cell 262 includes a hydrogen-cyanide wavelength reference absorption cell that absorbs light at discrete wavelengths corresponding to the molecular vibrational mode frequencies of the gas. The measured wavelength data is further directed to a data analysis unit 264 via an electronic interface 266 for detecting parameters of the environment based upon the Bragg wavelength shift data from each of the sensors 252.

Figure 22:
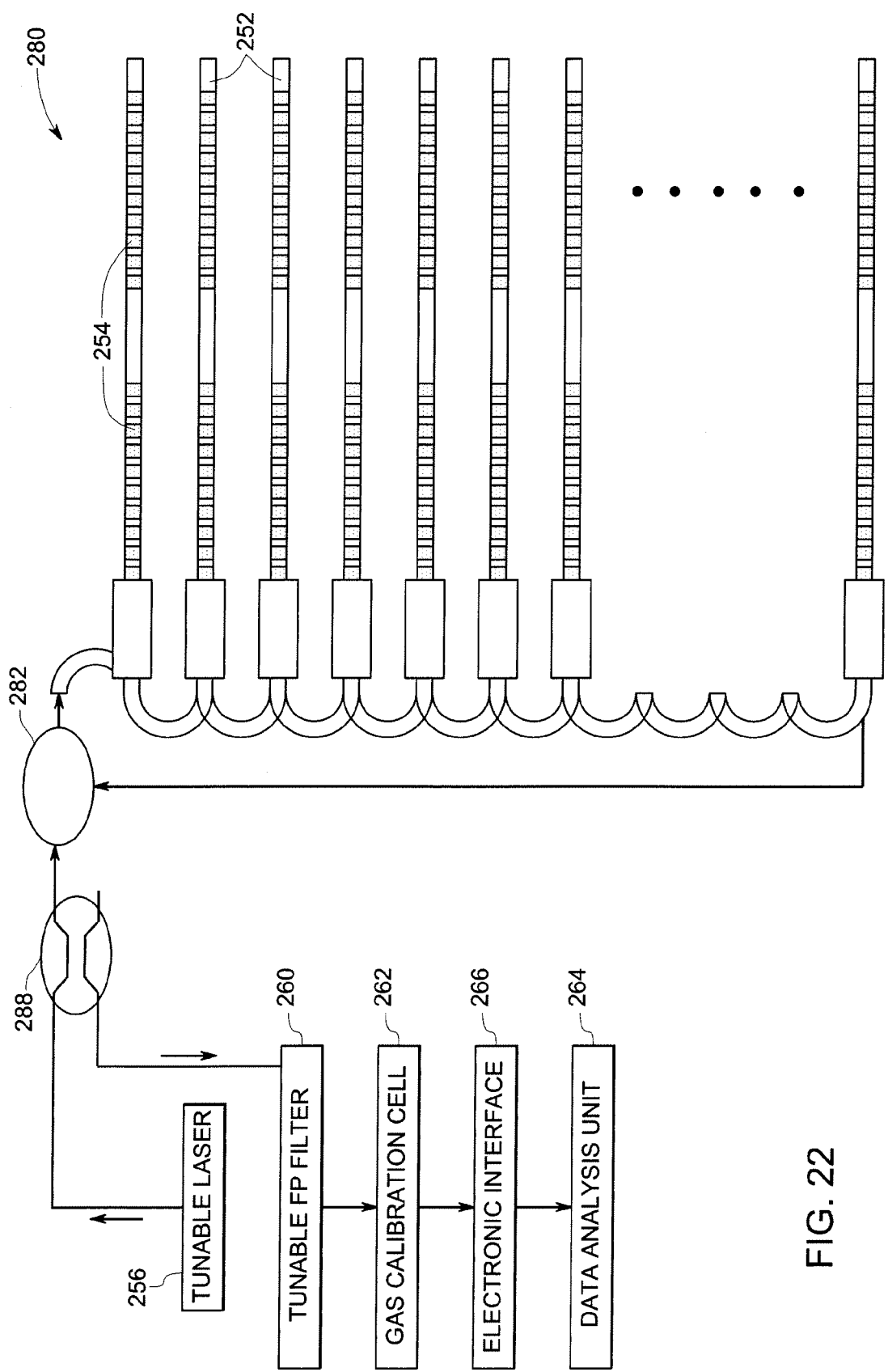
FIG. 22 is a diagrammatical illustration of an exemplary fiber optic dynamic sensing system in transmission configuration in accordance with aspects disclosed herein.

FIG. 22 is a diagrammatical illustration of an exemplary fiber optic dynamic sensing system 280 in transmission configuration in accordance with aspects disclosed herein. As illustrated with reference to FIG. 20, the sensing system 280 includes a tunable laser 256 and the 2×1 optical coupler 258 to illuminate the grating structure 254 of each of the sensors 252. In this exemplary embodiment, the sensing system 280 also includes a three port optical circulator 282 for launching the broadband light from the tunable laser 256 into the sensors 252. Further, the reflected light from each of the sensors 252 comes back through another port of the optical circulator 282 towards the FP filter 260. As discussed earlier, the data analysis unit 264 records the shifts in the peak reflectivity versus wavelength and such data are analyzed to estimate parameters of the environment 12 such as temperature, strain and vibration.

Figure 23:
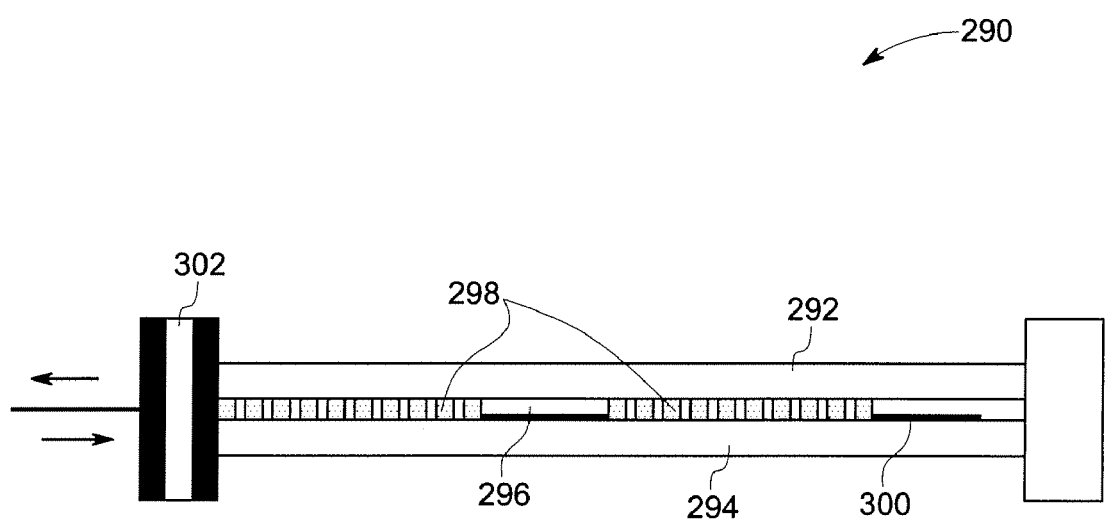
FIG. 23 is a side view of an exemplary fiber installation package employed in the sensing systems of FIGS. 20 and 21 respectively.

FIG. 23 is a side view of an exemplary fiber installation package 290 employed in the sensing systems 250 and 280 of FIGS. 21 and 22 respectively. The package 290 includes top and bottom plates 292 and 294 and a fiber optic cable 296 disposed between the top and bottom plates 292 and 294. In this exemplary embodiment, the top and bottom plates 292 and 294 include stainless steel plates. Further, the fiber optic cable 296 includes a grating structure 298 inscribed on a fiber core 300 for detecting a plurality of parameters of an environment. In this embodiment, the fiber core 300 includes a non-photosensitive fused quartz single mode fiber and the grating structure 298 includes a periodic or a quasiperiodic modulated microcrystalline and silicon dioxide tetrahedral grating structure. Advantageously, the non-photosensitive fused quartz single-mode fiber used for the fiber core 300 facilitates elimination of intra-band impurity energy levels of silicon dioxide fiber to prevent any carrier excitation from covalence bands to conduction bands at the elevated temperatures.

Further, as described above, the periodic or quasiperiodic modulated microcrystalline and silicon dioxide tetrahedral grating structure 298 is formed through a high power FL and phase mask inscribing technique followed by a thermal post-treatment process. In certain embodiments, the installation package 290 includes installation holes 302 to facilitate coupling of the installation package 290 to the components of the sensing system 250 and 280.

The fiber optic sensor described above may be employed to simultaneously detect a plurality of parameters in a variety of environments. The periodic or quasiperiodic modulated microcrystalline and rigid silicon dioxide tetrahedral grating structure on a non-photosensitive fiber formed by the high power FL FBG inscribed and the thermal treatment techniques can be used to detect parameters such a strain, vibration in harsh environments with high temperatures. Further, a packaging configuration for such sensor may be selected based upon the environment in which such sensor may be employed. In one exemplary embodiment, the fiber optic sensor described above is employed for water level sensing.

Figure 24:
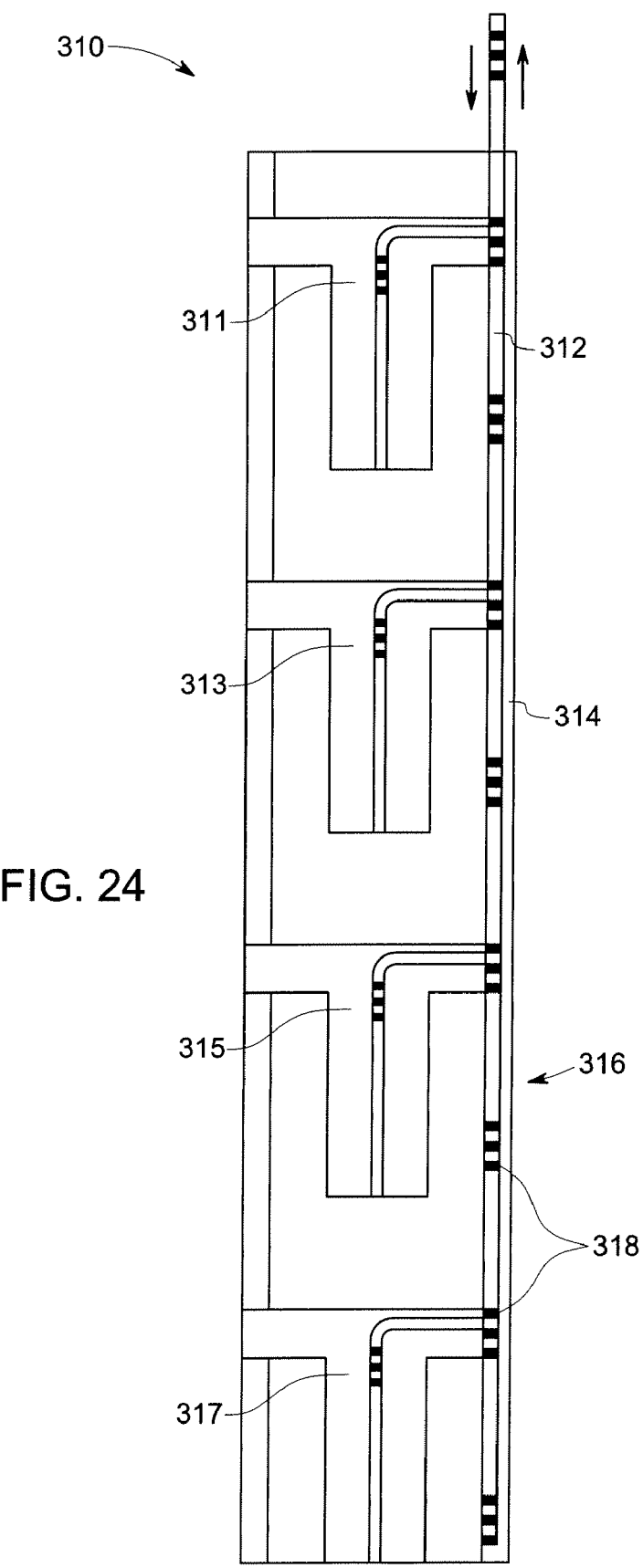
FIG. 24 illustrates an exemplary fiber sensing module package for a nuclear reactor water-level sensing application.

FIG. 24 illustrates an exemplary fiber sensing module package 310 for a water-level sensing application in a nuclear reactor. In the illustrated embodiment, the fiber sensing module 310 includes a fiber sensing cable 312 disposed within a casing 314. Further, the fiber sensing cable 312 includes an internal surface fiber sensing array 316 for dynamic temperature monitoring to determine thermal ramp, depressurization and flow-induced instabilities. The fiber-sensing array 316 employs a plurality of FBG sensors 318 fabricated by the techniques described above for resonant frequency monitoring to determine the water level. The sensing module 310 also includes a fiber vibration-sensing beam and integrated FL FBG sensors such as represented by reference numerals 311, 313, 315 and 317. Further, the fiber sensing module package is closed at the bottom to prevent falling of any parts in a water body and has opened lateral holes to facilitate the passage of water through the module 310. In this exemplary embodiment, the package material for the sensing module 310 includes AISI 304 stainless steel, or AISI 316 stainless steel, or Inconel™625. However, other suitable materials may be used for packaging the sensing module 310. The various aspects of the technique described above may be used for sensing multiple parameters such as, temperature, strain, pressure and vibration in a variety of environments. Advantageously, in accordance with embodiments disclosed herein, the fiber optic sensor having the periodic or quasiperiodic modulated microcrystalline and silicon dioxide tetrahedral structure on a non-photosensitive fiber has substantially low thermal sensitivity and low wavelength and reflected power loss drifting thereby enabling the use of such sensor for detecting parameters in a harsh environment such as those subjected to high temperatures and radiation. For example, the technique may be used for providing a thermal mapping in an exhaust system by measuring the temperature at multiple grating locations that are dispersed circumferentially about the exhaust system, or a combustor, or an output stage of a compressor of a jet engine. Similarly, the technique may be used for mapping a temperature distribution in components such as gas turbines, steam turbines, nuclear reactors, coal-fired boilers and so forth. It should be noted that since FBG is configured to measure the longitudinal strain along its axis, FBG's might also be set up in a rosette formation to determine strains along different directions and determining the principal strains on a component.

Further, as described above, the FL inscribed FBG sensor described above may be employed for sensing multiple parameters in a distributed environment. The sensor facilitates wavelength encoded temperature differentiated strain and vibration interrogation and has substantially high bandwidth and better thermal stability as compared to the conventional FBG sensors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fiber optic sensor, comprising:
   a fiber core having a plurality of grating elements, wherein the grating elements comprise a periodic or a quasiperiodic modulated microcrystalline and silicon dioxide tetrahedral structure that is not over-constrained; and
   a cladding disposed about the fiber core, wherein the fiber optic sensor comprises first and second claddings, and wherein the first cladding comprises a low-percentage fluorine or chlorine dopant and the second cladding comprises a relatively high-percentage fluorine or chlorine dopant.

2. The fiber optic sensor of claim 1, wherein the sensor is configured to simultaneously detect a plurality of parameters in a high or a dynamic temperature environment.

3. The fiber optic sensor of claim 2, wherein the sensor is configured to detect at least one parameter in a gas turbine, or a steam turbine, or a nuclear reactor vessel, or a combustion cell, or aircraft engines, or a coal-fired boiler, or combinations thereof.

4. The fiber optic sensor of claim 1, wherein the cladding comprises silicon dioxide with a fluorine dopant.

5. The fiber optic sensor of claim 1, further comprising:
   an optical source configured to illuminate the fiber core; and
   a detector module configured to detect at least one parameter based upon a reflection spectrum generated from the grating elements.

6. A distributed sensing system for sensing a plurality of parameters in an environment, comprising:
   a plurality of sensors disposed on a distributed cable, wherein each of the plurality of sensors comprises:
   a fiber core having a periodic or a quasiperiodic modulated microcrystalline and silicon dioxide tetrahedral grating structure that is not over-constrained; and
   a cladding disposed about the fiber core, wherein the fiber optic sensor comprises first and second claddings, and wherein the first cladding comprises a low-percentage fluorine or chlorine dopant and the second cladding comprises a relatively high-percentage fluorine or chlorine dopant.

7. The distributed sensing system of claim 6, further comprising an optical source configured to illuminate the fiber core of each of the plurality of sensors.

8. The distributed sensing system of claim 7, wherein the optical source comprises a tunable laser.

9. The distributed sensing system of claim 7, further comprising an optical spectral analyzer configured to measure a parameter based on a wavelength spectrum from the distributed sensor system.

* * * * *